US012455085B2

(12) United States Patent
Park et al.

(10) Patent No.: US 12,455,085 B2
(45) Date of Patent: Oct. 28, 2025

(54) VENTILATION APPARATUS

(71) Applicant: LG ELECTRONICS INC., Seoul (KR)

(72) Inventors: Janghee Park, Seoul (KR); Jinwoo Lee, Seoul (KR); Yongki Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 18/099,637

(22) Filed: Jan. 20, 2023

(65) Prior Publication Data

US 2024/0019140 A1 Jan. 18, 2024

(30) Foreign Application Priority Data

Jul. 18, 2022 (KR) .................. 10-2022-0088326

(51) Int. Cl.
  *F24F 7/08* (2006.01)
  *F24F 7/00* (2021.01)
  *F24F 13/20* (2006.01)

(52) U.S. Cl.
  CPC ............... *F24F 7/08* (2013.01); *F24F 13/20* (2013.01); *F24F 2007/001* (2013.01); *F24F 2013/205* (2013.01)

(58) Field of Classification Search
  CPC .............. F24F 7/08; F24F 13/20; F24F 12/006
  See application file for complete search history.

(56) References Cited

U.S. PATENT DOCUMENTS

| | | | | |
|---|---|---|---|---|
| 2005/0252647 A1* | 11/2005 | Lee | .................. | F28D 9/0062 |
| | | | | 165/166 |
| 2019/0390869 A1* | 12/2019 | Momose | ............... | F28F 9/0075 |
| 2023/0055517 A1* | 2/2023 | Choi | ..................... | F24F 13/28 |

FOREIGN PATENT DOCUMENTS

| | | | | |
|---|---|---|---|---|
| KR | 10-1703672 B1 | | 2/2017 | |
| KR | 2018029305 A | * | 3/2018 | .......... F24F 11/0001 |
| KR | 20-0489341 Y1 | | 6/2019 | |
| KR | 10-2124364 B1 | | 6/2020 | |
| KR | 10-2021-0010596 A | | 1/2021 | |
| KR | 10-2317245 B1 | | 10/2021 | |
| KR | 10-2327427 B1 | | 11/2021 | |
| KR | 10-2022-0045405 A | | 4/2022 | |
| WO | WO 2021/159933 A1 | | 8/2021 | |

* cited by examiner

*Primary Examiner* — Allen R. B. Schult
(74) *Attorney, Agent, or Firm* — Birch, Stewart, Kolasch & Birch, LLP

(57) ABSTRACT

A ventilation apparatus includes a housing; a case accommodated in the housing and including a main case having a suction passage for guiding outdoor air into an indoor and an exhaust passage for guiding indoor air to an outdoor and formed by crossing the suction passage, and a lower case coupled to a lower side of the main case; a ventilation module disposed at a position inside the main case where the suction passage and the exhaust passage cross each other, and including at least a total heat exchange element for heat exchange between outdoor air and indoor air without mixing; a suction fan module placed on the suction passage to suck outdoor air; an exhaust fan module placed on the exhaust passage to suck indoor air; and an evaporator placed on the suction passage at a position between the ventilation module and the suction fan module.

12 Claims, 25 Drawing Sheets

VENTILATION APPARATUS

CROSS-REFERENCE TO RELATED APPLICATION

The present application claims the benefits of priority to Korean Patent Application No. 10-2022-0088326, filed on Jul. 18, 2022, of which is incorporated herein by reference in its entirety.

BACKGROUND

The present disclosure relates to a ventilation apparatus.

A ventilation apparatus is an apparatus for discharging indoor air to the outside and supplying fresh outdoor air to the indoor space, and the main component of the ventilation apparatus is a total heat exchange element that allows only heat exchange without mixing the discharged indoor air and the introduced outdoor air.

Recently, a complex ventilation apparatus capable of performing a cooling function in addition to a ventilation function through total heat exchange has emerged.

Korean Patent Registration No. 10-2124364 (Jun. 18, 2020) discloses a complex ventilation apparatus in which a refrigeration system that forms a cooling cycle using a refrigerant inside the ventilation apparatus is mounted.

In the ventilation apparatus disclosed in the prior art, the components for cooling and heating, that is, a compressor, a condenser (second heat exchanger), and an evaporator (first heat exchanger) are installed inside the ventilation apparatus, and a damper (defined as a second damper) is provided for rapid cooling in which discharged indoor air passes through the evaporator rather than the total heat exchange element and then flows back into the indoor space.

The conventional complex ventilation apparatus having the above-described structure has the following disadvantages.

First, since both the evaporator and the compressor are provided inside the ventilation apparatus, there is a disadvantage in that a supply fan and an exhaust fan of the ventilation apparatus have to be driven simultaneously in an operation mode in which a cooling cycle is driven. For example, when the indoor rapid cooling operation is performed by closing the first damper and opening the second damper while the cooling cycle is driven, the exhaust fan has to operate for cooling the condenser. In the indoor rapid cooling operation mode, the outdoor air introduced by the operation of the exhaust fan has to be bypassed without passing through the total heat exchange element, so that heat is absorbed from the condenser and then discharged back to the outdoors through an exhaust discharge passage. To this end, a separate damper has to be provided to guide the introduced outdoor air to the exhaust discharge passage. As described above, when the compressor and the condenser are installed inside the ventilation apparatus, there is a disadvantage in that at least four dampers have to be provided.

Therefore, since the exhaust fan has to necessarily operate to cool the condenser in the rapid cooling mode, there is a disadvantage in that power consumption increases.

Second, since the heavy evaporator and compressor are all provided inside the ventilation apparatus, the volume and weight of the ventilation apparatus increase. Accordingly, there is a difficulty in installing the ventilation apparatus, and there is a risk of falling due to gravity after installation.

Third, if there is a problem in the operation of the compressor, there is a disadvantage in that the repair is not easy.

Fourth, since a passage for discharging contaminated indoor air directly to the outdoors without passing through the total heat exchange element is not provided inside the ventilation apparatus, there is a disadvantage in that the life of the total heat exchange element is shortened. For example, if fish or meat is cooked, indoor air containing odors and smoke passes through the total heat exchange element, and thus, animal fat with high viscosity is deposited on the surface of the total heat exchange element. This deposition phenomenon increases the flow resistance of the exhausted indoor air and acts as a factor of lowering the total heat exchange efficiency with the introduced outdoor air.

Fifth, since the indoor air discharged to the outdoors has to pass through the total heat exchange element, the outdoor air passing through the total heat exchange element absorbs heat from the discharged indoor air when the indoor temperature is higher than the outdoor temperature. As a result, since fresh air with a relatively low temperature cannot be supplied to the indoor space, there is a disadvantage in that a user does not feel a ventilation effect in summer.

Sixth, in the prior art, since air is purified while the introduced outdoor air passes through the total heat exchange element and then passes through various filters, various contaminants including dust may be accumulated inside the total heat exchange element, and harmful bacteria may proliferate while being attached to the surface of the total heat exchange element.

SUMMARY

The present disclosure is proposed to solve the above problems.

A ventilation apparatus according to an embodiment of the present disclosure includes: a housing; a case accommodated in the housing and including a main case having a suction passage for guiding outdoor air into an indoor and an exhaust passage for guiding indoor air to an outdoor and formed by crossing the suction passage, and a lower case coupled to a lower side of the main case; a ventilation module disposed at a position inside the main case where the suction passage and the exhaust passage cross each other, and including at least a total heat exchange element for heat exchange between outdoor air and indoor air without mixing; a suction fan module placed on the suction passage to suck outdoor air; an exhaust fan module placed on the exhaust passage to suck indoor air; and an evaporator placed on the suction passage at a position between the ventilation module and the suction fan module, wherein an outdoor air inlet defining an inlet of the suction passage and an indoor air outlet defining an outlet of the exhaust passage are formed on one side surface of the main case, wherein an outdoor air outlet defining an outlet of the suction passage and an indoor air inlet defining an inlet of the exhaust passage are formed on the other side surface of the main case facing the one side surface, wherein a bypass passage is formed between the main case and the lower case to bypass the ventilation module and connect the indoor air inlet to the indoor air outlet, and wherein a rotational axis of the exhaust fan module is parallel to a central axis of the indoor air outlet.

A ventilation module mounting area, an exhaust air entrance area communicating with the indoor air inlet, an exhaust air introducing area defined between the ventilation module mounting area and the exhaust air entrance area, an exhaust air flow transition space communicating with the indoor air outlet, and an exhaust air exhausting area defined between the ventilation module mounting area and the exhaust air flow transition space are defined inside the main case, and the exhaust passage is a passage that sequentially connects the exhaust air entrance area, the exhaust air introducing area, the ventilation module mounting area, the exhaust air exhausting area, and the exhaust air flow transition space.

The main case includes an exhaust fan mounting wall which partitions the exhaust air flow transition space and the exhaust air exhausting area, and on which an exhaust fan mounting hole is formed, and an outlet of the exhaust fan module is fixed to the exhaust fan mounting wall.

A supply air introducing area communicating with the outdoor air inlet and a supply air discharge area communicating with the outdoor air outlet are defined inside the main case, the ventilation module mounting area is defined between the supply air introducing area and the supply air discharge area, and the suction passage is a passage that sequentially connects the supply air introducing area, the ventilation module mounting area, and the supply air discharge area.

A bypass guide area connecting the exhaust air entrance area to an inlet of the bypass passage is defined in the main case, and an outlet of the bypass passage is connected to the exhaust air exhausting area.

The exhaust air flow transition space is located above the outlet of the bypass passage.

The bypass passage is completed by coupling an upper bypass groove formed on a bottom surface of the middle case and a lower bypass groove formed on an upper surface of the lower case.

The ventilation apparatus having the above-described configuration according to an embodiment of the present disclosure has the following advantages and effects.

First, since only the evaporator among the components of the cooling cycle is provided inside the ventilation apparatus, the volume and weight of the ventilation apparatus are reduced. Accordingly, it is easy to install the ventilation apparatus, and there is an advantage in that the risk of falling due to gravity is reduced.

Second, since the condenser is not installed inside the ventilation apparatus, there is no need to drive the exhaust fan in the rapid cooling mode which bypasses the indoor air to pass through the evaporator and then discharges the indoor air to the indoor space. Accordingly, there is an advantage in that power consumption is reduced.

Third, since the bypass passage is provided inside the ventilation apparatus so that the indoor air is discharged directly to the outdoors without passing through the total heat exchange element, there is an advantage in that the life of the total heat exchange element is prolonged by minimizing the contamination of the total heat exchange element.

Fourth, since it is possible to discharge the indoor air through the bypass passage, the introduced outdoor air can be supplied to the indoor space without recovering waste heat contained in the indoor air. Accordingly, there is an advantage in that ventilation performance and user satisfaction are improved.

Fifth, as outdoor air passes through various filters before the outdoor air is introduced into the total heat exchange element, foreign matters and harmful bacteria are filtered out in advance. Accordingly, there is an advantage in that the life of the total heat exchange element is prolonged.

Sixth, since the ventilation means including the total heat exchange element and the filters are provided in the form of a single module, there is an advantage of easy installation and repair.

Seventh, since the compressor and the condenser are installed outside the ventilation apparatus, the size of the evaporator can be made larger, thereby increasing cooling capacity.

DETAILED DESCRIPTION OF THE EMBODIMENTS

Hereinafter, a ventilation apparatus according to an embodiment of the present disclosure will be described in detail with reference to the accompanying drawings.

Figure 1:
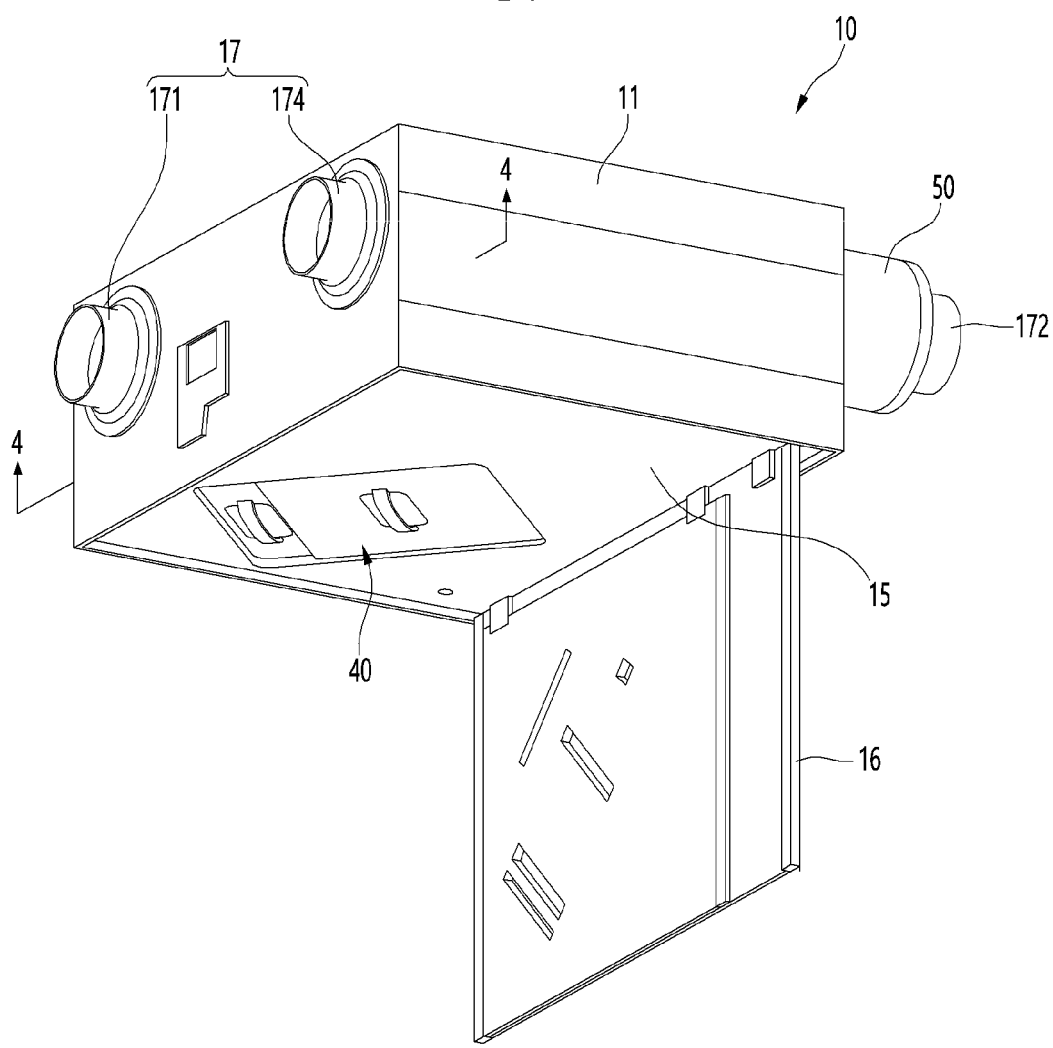
FIG. 1 is a bottom perspective view of a ventilation apparatus according to an embodiment of the present disclosure.
Figure 2:
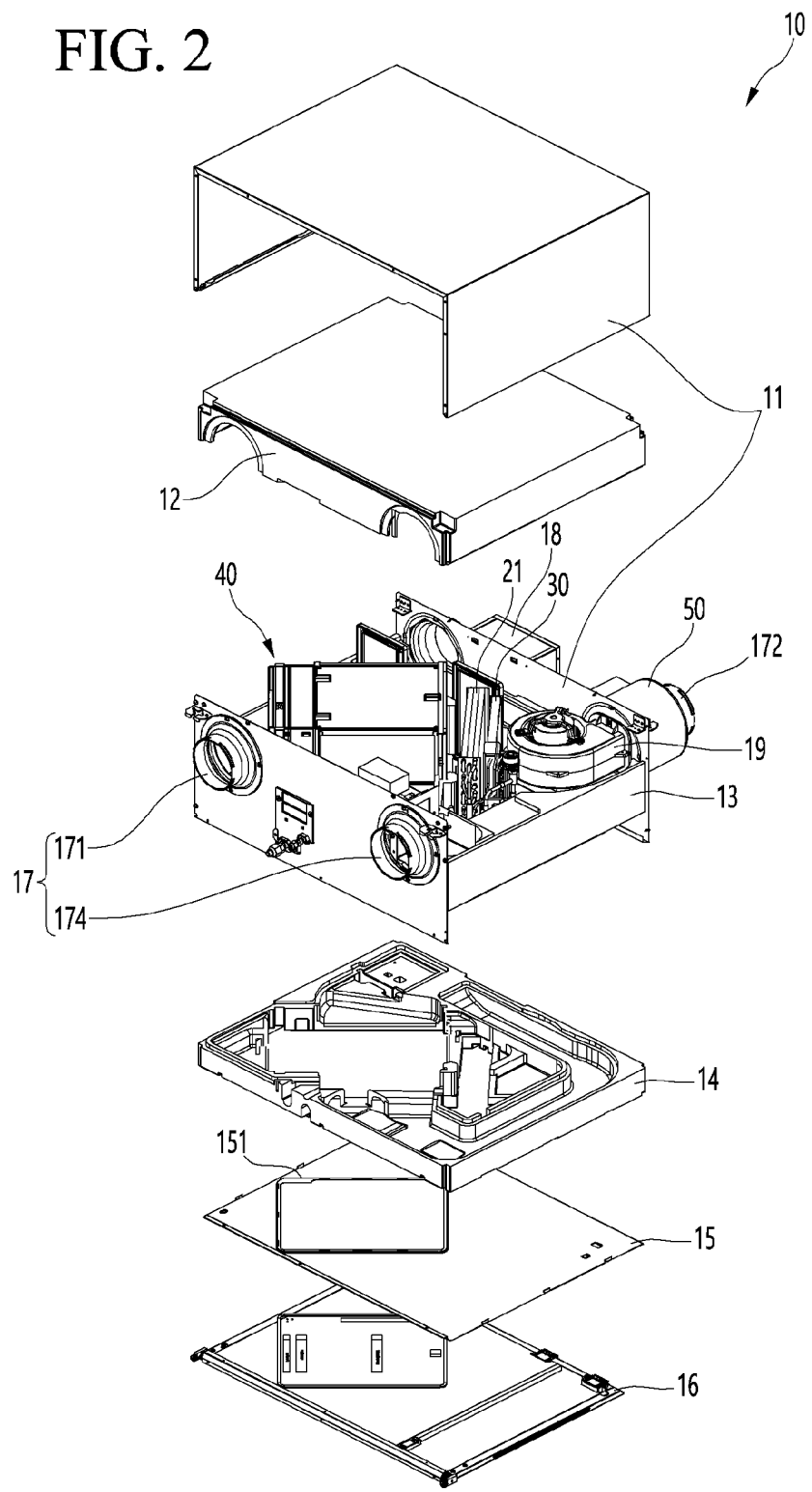
FIG. 2 is an exploded perspective view of the ventilation apparatus.
Figure 3:
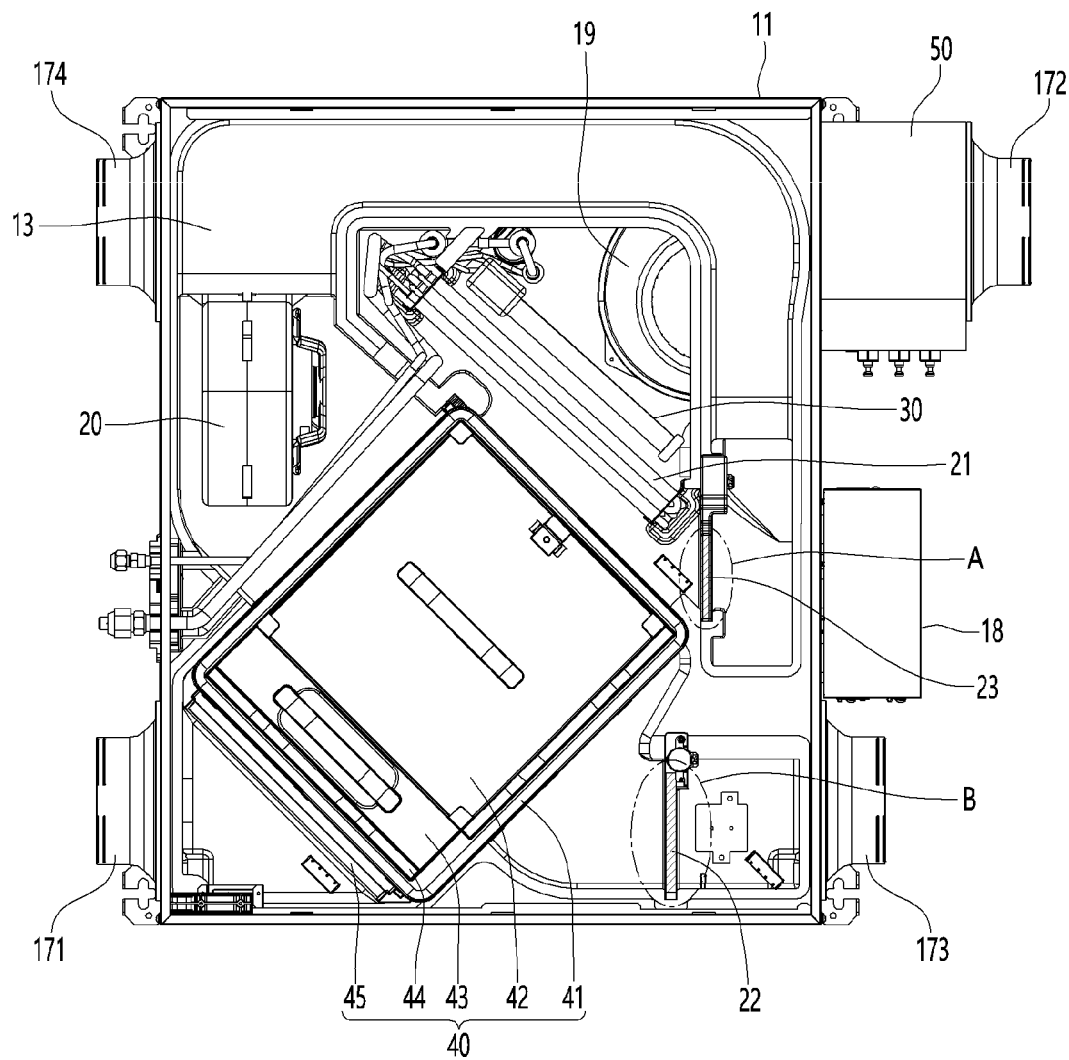
FIG. 3 is a bottom view showing the internal configuration of the ventilation apparatus.
Figure 4:
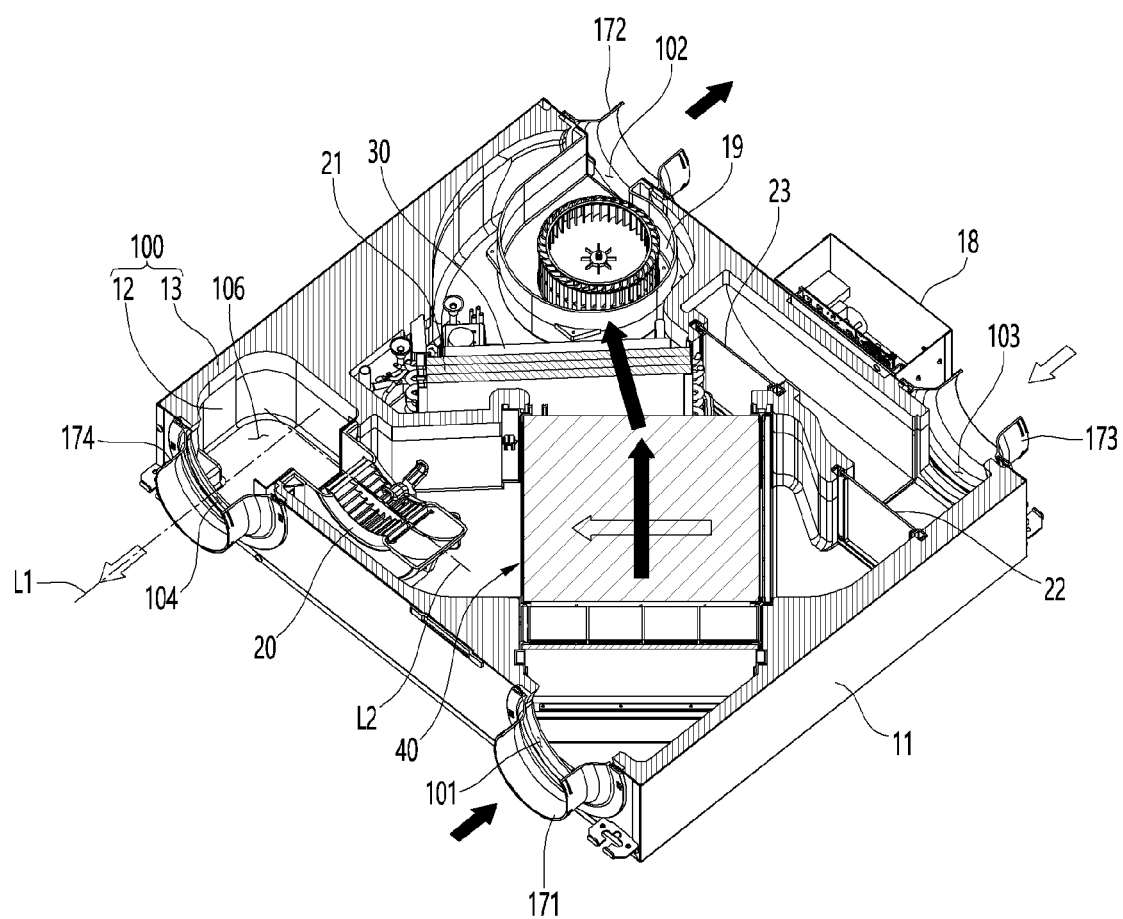
FIG. 4 is a cross-sectional perspective view of the ventilation apparatus taken along line 4-4 of FIG. 1.

FIG. 1 is a bottom perspective view of a ventilation apparatus according to an embodiment of the present disclosure, FIG. 2 is an exploded perspective view of the ventilation apparatus, FIG. 3 is a bottom view showing the internal configuration of the ventilation apparatus, and FIG. 4 is a cross-sectional perspective view of the ventilation apparatus taken along line 4-4 of FIG. 1.

Referring to FIGS. 1 to 4, a ventilation apparatus 10 according to an embodiment of the present disclosure is mainly installed on the ceiling, so that a user mainly recognizes the bottom surface of the ventilation apparatus 10.

As shown in FIG. 1, the user may open a cover provided on the bottom surface of the ventilation apparatus 10 to separate or replace a ventilation module.

In detail, the ventilation apparatus 10 according to an embodiment of the present disclosure includes a hexahedral housing 11 forming an external appearance and having an open bottom surface, a shield cover 16 covering the open bottom surface of the housing 11, and a plurality of duct flanges respectively mounted on two opposite sides of the housing 11.

An outdoor air inlet 101 and an indoor air outlet 104 are formed at both ends of one side of the housing 11, respectively. In addition, an indoor air inlet 103 and an outdoor air outlet 102 are formed at both ends of the other side of the housing 11 facing the one side, respectively.

The outdoor air inlet 101 is formed at a position facing the indoor air inlet 103, and the indoor air outlet 104 is formed in a position facing the outdoor air outlet 102.

The outdoor air introduced into the outdoor air inlet 101 is discharged to the indoor space through the outdoor air outlet 102 located in a diagonal direction, and the indoor air introduced into the indoor air inlet 103 is discharged to the outdoors through the indoor air outlet 104 located in a diagonal direction. This is because the outdoor air and the indoor air flow in directions crossing each other when passing through the ventilation module to be described later among components accommodated in the housing 11.

Meanwhile, the duct flange 17 includes an outdoor air inlet flange 171 mounted on the outdoor air inlet 101, an outdoor air discharge flange 172 mounted on the outdoor air outlet 102, an indoor air inlet flange 173 mounted to the indoor air inlet 103, and an indoor air exhaust flange 174 mounted on the indoor air outlet 104.

Optionally, a heating device 50 may be mounted on the outdoor air outlet 102. When the heating device 50 is mounted on the outdoor air outlet 102, the outdoor air discharge flange 172 may be mounted on the outlet of the heating device 50.

In addition, the ventilation apparatus 10 further includes a case accommodated in the housing 11, and a lower cover 15 provided between the case and the shield cover 16 to cover the bottom surface of the case. A passage hole 151 through which the ventilation module, which will be described later, passes is formed in the lower cover 15.

The case includes a lower case 14, a middle case 13, and an upper case 12. The combination of the upper case 12 and the middle case 13 may be defined as a main case 100. The lower cover 15 is mounted on the lower surface of the lower case 14 and is shielded by the shield cover 16. The shield cover 16 is rotatably coupled to the housing 11 to selectively shield the shield cover 16.

The ventilation apparatus 10 further includes a ventilation module 40 installed inside the case, a cooling module, and a fan module. The cooling module includes components constituting a refrigerant cycle using a refrigerant as a circulating fluid, and may include at least the evaporator 21 through which a low-temperature and low-pressure two-phase refrigerant flows. The evaporator 21 may be located at the outlet side of the ventilation module 40.

The fan module includes a suction fan module 19 that sucks outdoor air and discharges the outdoor air to the indoor space, and an exhaust fan module 20 that sucks indoor air and exhausts the indoor air to the outside. The fan module includes a fan and a motor that rotates the fan module.

The suction fan module 19 may be disposed at a position where the outdoor air outlet 102 is formed, so that the outlet of the suction fan module 19 is connected to the outdoor air outlet 102. In addition, the exhaust fan module 20 may be disposed at a position where the indoor air outlet 104 is formed, so that the outlet of the exhaust fan module 20 is connected to the indoor air outlet 104.

The ventilation module 40 includes a module frame 41, and a total heat exchange element 42 accommodated in the module frame 41. Optionally, the ventilation module 40 may further include at least one of a HEPA filter 43, a pre-filter 44, and an optical filter 45. The optical filter 45 refers to a filter that removes harmful bacteria such as mites in the outdoor air sucked into the ventilation module 40 or the pre-filter 44 by using ultraviolet rays from an ultraviolet lamp.

In the ventilation module 40, the optical filter 45, the pre-filter 44, the HEPA filter 43, and the total heat exchange element 42 are sequentially arranged from the side closer to the outdoor air inlet 101, so that outdoor air introduced through the outdoor air inlet 101 sequentially passes through the optical filter 45, the pre-filter 44, the HEPA filter, and the total heat exchange element 42 and is then supplied to the indoor space through the outdoor air outlet 102.

Optionally, the ventilation apparatus 10 may further include an air cleaning module 30. The air cleaning module 30 may be disposed between the evaporator 21 and the ventilation module 40 or between the evaporator 21 and the suction fan module 19. That is, the ventilation module 40, the air cleaning module 30, and the evaporator 21 may be disposed on a passage through which outdoor air flows, and the arrangement positions of these components may be appropriately selected according to the structure of the case, particularly the main case 100.

The fan module may be a centrifugal fan that sucks air in an axial direction and discharges the air in a radial direction, but is not limited thereto. When the fan module is a centrifugal fan, the outlet of the suction fan module 19 is directly connected to the outdoor air outlet 102. Accordingly, the central axis of the outdoor air discharge flange 172 passes through the center of the discharge port of the suction fan module 19. In another aspect, it may be described that the central axis of the outdoor air discharge flange 172 (or the central axis of the outdoor air outlet) and the fan shaft of the suction fan module 19 are perpendicular to each other.

On the other hand, in order to make the ventilation apparatus 10 compact or secure a space inside the main case 100 in a state where the standard of the housing 11 is determined, the fan shaft of the exhaust fan module 20 may be disposed parallel to the central axis L1 of the indoor air discharge flange 174 (or the central axis of the indoor air outlet). That is, the line L2 passing through the center of the outlet of the exhaust fan module 20 and the central axis L1 of the indoor air discharge flange 174 may be designed to be perpendicular to each other. In addition, an exhaust air flow transition space 106 is formed between the exhaust fan module 20 and the indoor air outlet 104.

As another expression, the mounting position of the exhaust fan module 20 is designed so that the central axis of the indoor air outlet 104 and the rotational shaft of the exhaust fan module 20 are parallel to each other.

Meanwhile, an outdoor air passage through which outdoor air flows and an indoor air passage through which indoor air flows are formed inside the main case 100 in directions crossing each other. The ventilation module 40 is placed at a position where the flows of indoor air and outdoor air cross each other. A first damper unit 22 is installed on the indoor air passage that connects the indoor air inlet 103 to the ventilation module 40. The first damper unit 22 allows the indoor air introduced into the indoor air inlet 103 to selectively flow to either of the ventilation module 40 and a bypass passage (to be described later). The bypass passage is formed between the middle case 13 and the lower case 14, which will be described in more detail below.

In addition, a second damper unit 23 is installed inside the main case 100 to switch the passage so that the indoor air flowing into the indoor air inlet 103 and flowing toward the bypass passage flows to the outdoor air passage where the evaporator 21 is installed. That is, the bypass passage and the outdoor air passage may be selectively connected to each other by the second damper unit 23. Specifically, in a situation where rapid cooling is required, the second damper unit 23 operates so that the indoor air introduced into the indoor air inlet 103 passes through the evaporator 21 and is then discharged back into the indoor space through the outdoor air outlet 102.

Meanwhile, the ventilation apparatus 10 further includes a control box 18 that controls the operations of various components accommodated in the housing 11. The various components may include the fan modules 19 and 20, the damper units 22 and 23, the air cleaning module 30, the optical filter 45, and the like. In addition, the control box 18 may be mounted on the side surface of the housing 11, specifically, the indoor side surface.

Figure 5:
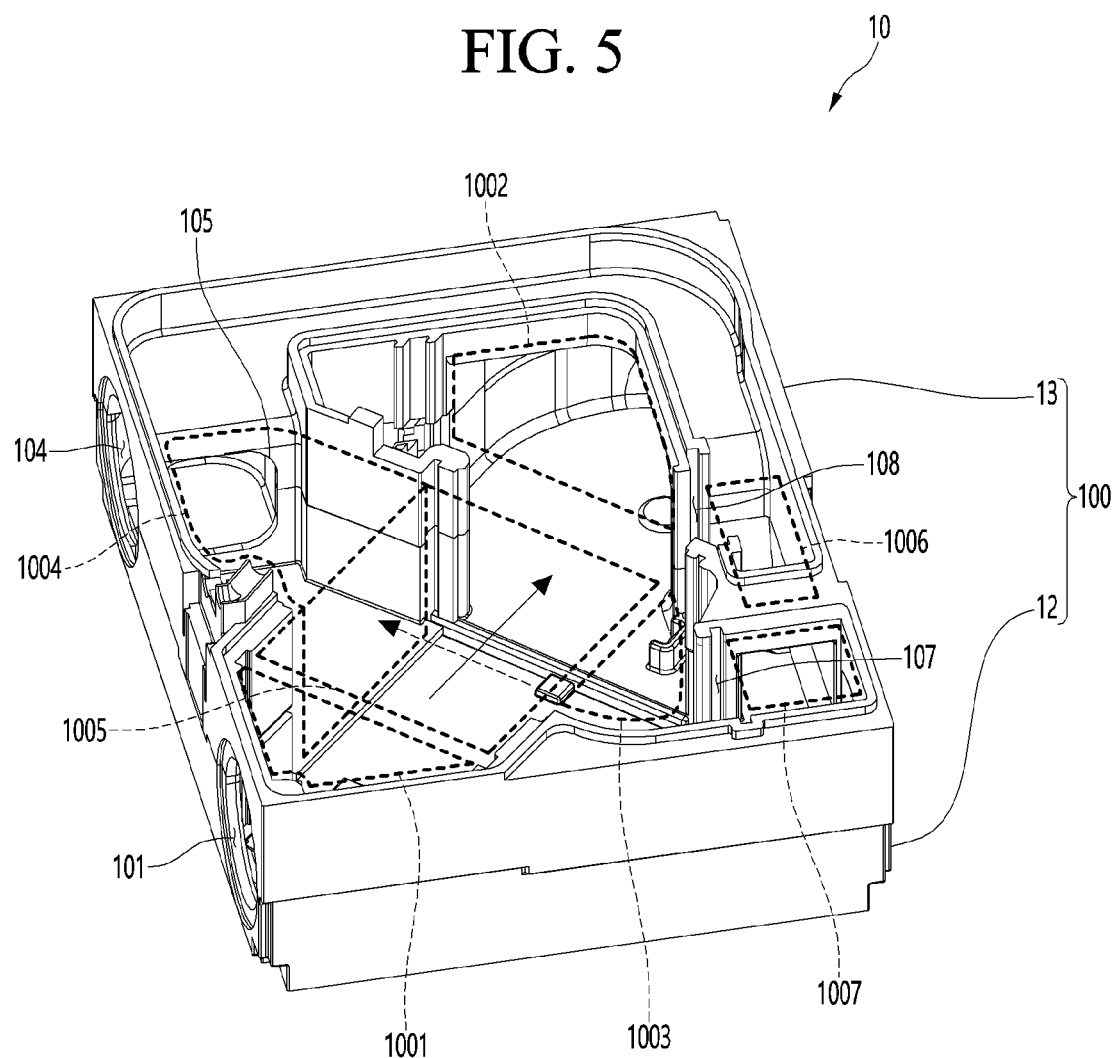
FIG. 5 is a bottom perspective view of a main case constituting the ventilation apparatus according to an embodiment of the present disclosure.

FIG. 5 is a bottom perspective view of the main case constituting the ventilation apparatus according to an embodiment of the present disclosure.

Referring to FIG. 5, the main case 100 may be understood as a combination of the upper case 12 and the middle case 13, as described above.

The inside of the main case 100 is formed in a direction in which the outdoor air passage and the indoor air passage cross each other. The outdoor air inlet 101 and the outdoor air outlet 104 are formed on one side surface of the main case 110, and the outdoor air inlet 103 and the outdoor air outlet 102 are formed on the other side surface of the main case 110. Some of the four air passage holes 101 to 104 are formed on the side surface of the upper case 12, and the others thereof are formed on the side surface of the lower case 13. When the lower case 13 and the upper case 12 are coupled to each other, a circular hole is formed.

A supply air introducing area 1001, a supply air discharge area 1002, an exhaust air introducing area 1003, an exhaust air exhausting area 1004, a ventilation module mounting area 1005, a bypass guide area 1006, an exhaust air entrance area 1007, and the exhaust air flow transition space 106 (see FIG. 4) are defined inside the main case 100.

The indoor air inlet 103 is formed on one side surface of the main case 100 defining the edge of the exhaust air entrance area 1007, and a first damper hole 107 is formed on the side surface of the exhaust air entrance area 1007 corresponding to the opposite side of the indoor air inlet 103. The first damper unit 22 is mounted in the first damper hole 107.

In addition, one end of the bypass guide area 1006 is connected to the side surface of the exhaust air entrance area 1007 where the first damper hole 107 is formed or to the side surface perpendicular to the side surface on which the indoor air inlet 103 is formed.

In addition, the ventilation module mounting area 1005 is formed at a position where the supply air passage and the exhaust passage cross each other. In the ventilation module mounting area 1005, first to fourth side surfaces are continuously formed to correspond to the shape of the ventilation module 40.

The supply air introducing area 1001 is defined between the outdoor air inlet 101 and the first side surface of the ventilation module mounting area 1005.

The exhaust air introducing area 1003 is defined between the exhaust air entrance area 1007 and the second side surface of the ventilation module mounting area 1005. The exhaust air introducing area 1003 and the exhaust air entrance area 1007 selectively communicate with each other by the operation of the first damper unit 22.

The bypass guide area 1006 connects the exhaust air entrance area 1007 to the inlet of the bypass passage, and the outlet of the bypass passage is connected to the exhaust air exhausting area 1004. The first side surface and the second side surface are side surfaces adjacent to each other.

The supply air discharge area 1002 is defined between the outdoor air outlet 102 and a third side surface of the ventilation module mounting area 1005. The second damper hole 108 is formed at the boundary between the supply air discharge area 1002 and the bypass guide area 1006. The bypass guide area 1006 and the supply air discharge area 1002 selectively communicate with each other by the operation of the second damper unit 23. The third side surface is located on the side opposite to the first side surface.

In addition, the exhaust air exhausting area 1004 extends from the fourth side surface of the ventilation module mounting area 1005 to the exhaust air flow transition space 106. An exhaust fan mounting hole 105 is formed at the boundary partitioning the exhaust air exhausting area 1004 and the ventilation module mounting area 1005, and the outlet of the exhaust fan module 20 is connected to the exhaust fan mounting hole 105.

The exhaust fan mounting hole 105 and the indoor air outlet 104 are formed on vertical planes crossing each other, and the indoor air flowing along the exhaust air exhausting area 1004 is discharged to the indoor air outlet 104 after the flow direction is changed in the exhaust air flow transition space 106.

The exhaust air exhausting area 1004 and the supply air discharge area 1002 are partitioned by a flow separation wall, so that mixing of the exhausted indoor air and the introduced outdoor air is blocked.

The exhaust fan module 20 is disposed in the exhaust air exhausting area 1004, and the suction fan module 19 is disposed in the supply air discharge area 1002.

Figure 6:
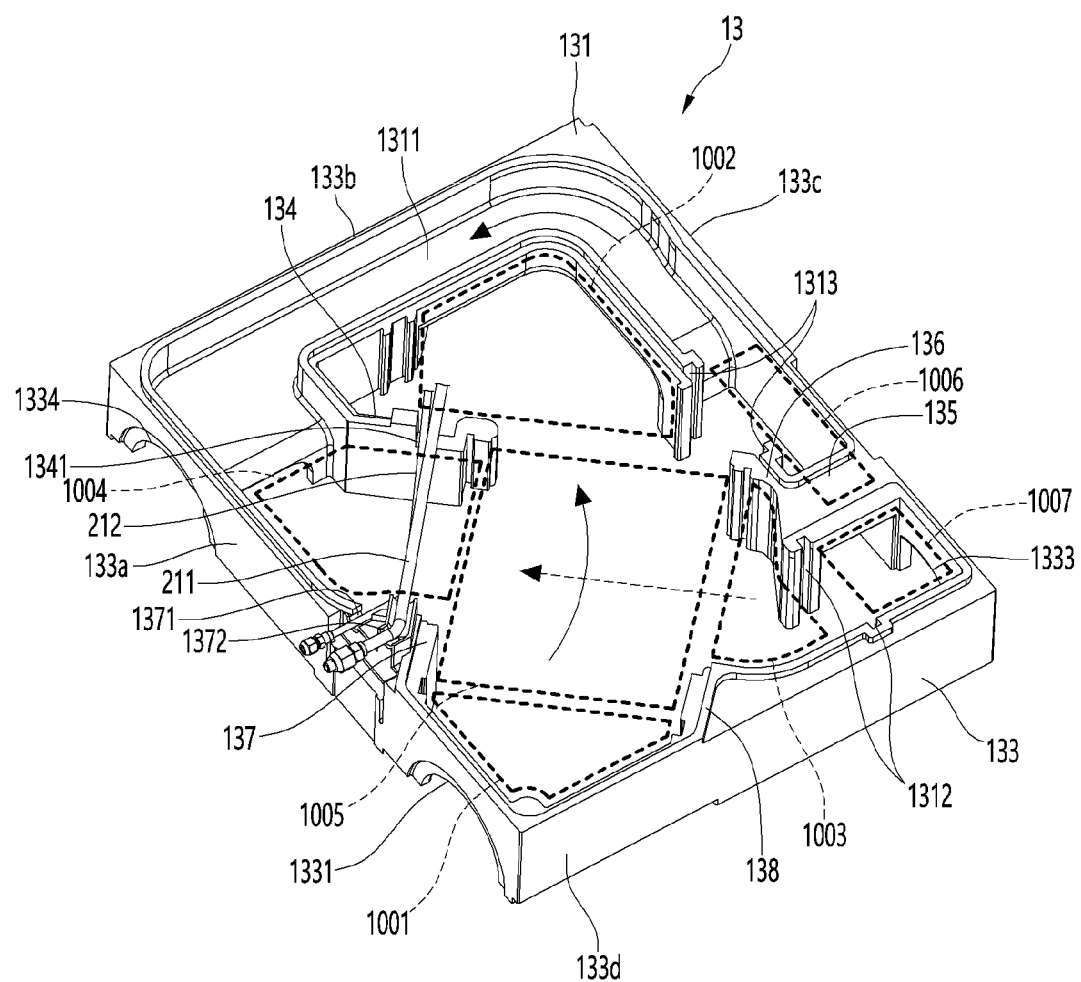
FIG. 6 is a bottom perspective view of a middle case constituting the main case of the ventilation apparatus according to an embodiment of the present disclosure.
Figure 7:
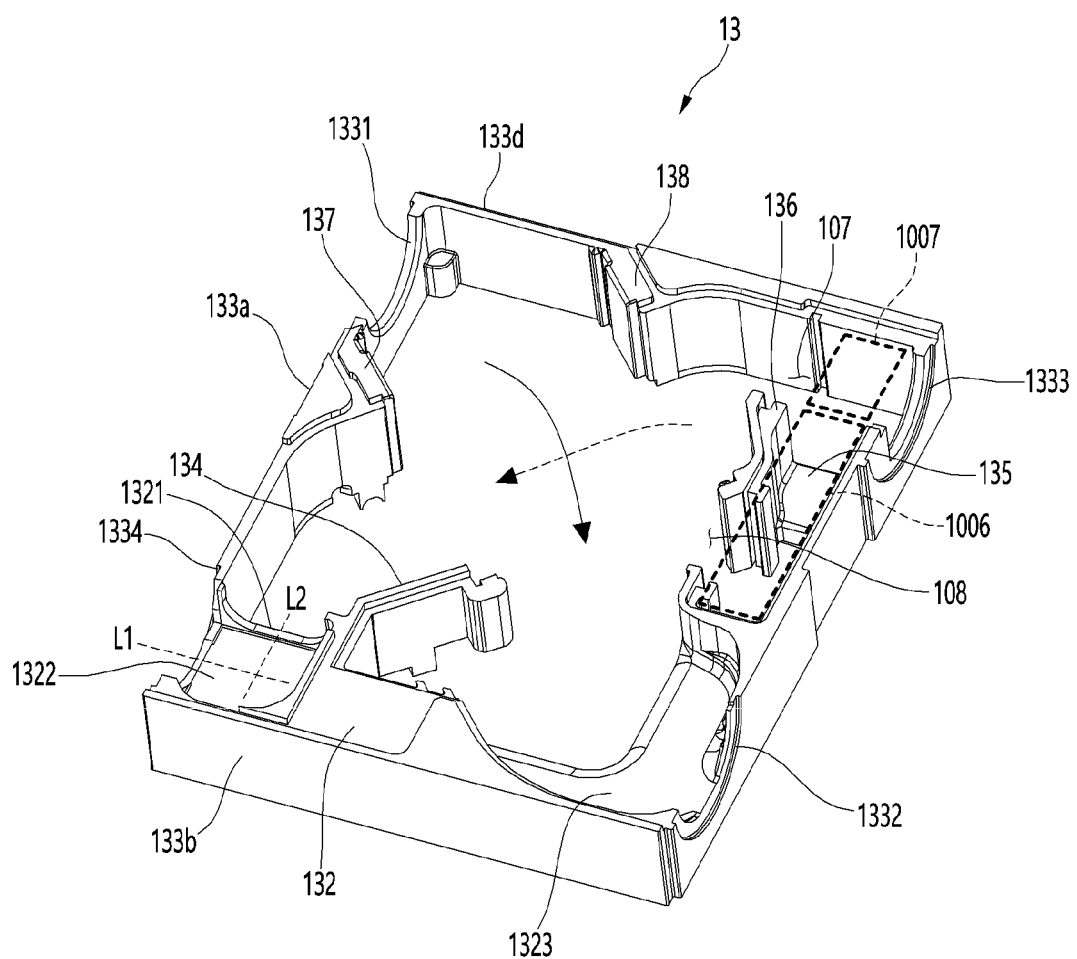
FIG. 7 is a top perspective view of the middle case.

FIG. 6 is a bottom perspective view of the middle case constituting the main case of the ventilation apparatus according to an embodiment of the present disclosure, and FIG. 7 is a top perspective view of the middle case.

Referring to FIGS. 6 and 7, the middle case 13 includes a bottom surface 131 to which the upper surface of the lower case 14 is coupled, an upper surface 132 to which the bottom surface of the upper case 12 is coupled, and a side surface 133 connecting the upper surface 132 to the lower surface 131.

The side surface 133 includes a first surface 133a, a second surface 133b, a third surface 133c, and a fourth surface 133d. The first surface 133a and the third surface 133c face each other, and the second surface 133b and the fourth surface 133d face each other.

An outdoor air inlet groove 1331 and an indoor air outlet groove (or exhaust air exhausting groove) 1334 are formed in the first surface 133a, and an indoor air inlet groove 1333 and an outdoor air exhaust groove 1332 are formed in the third surface 133c.

The outdoor air inlet groove 1331 forms a half of the outdoor air inlet 101, and the indoor air outlet groove 1334 forms a half of the outdoor air outlet 104. The indoor air inlet groove 1333 forms a half of the indoor air inlet 103, and the outdoor air exhaust groove 1332 forms a half of the outdoor air outlet 102.

An upper bypass groove 1311 is formed in the edge of the bottom surface 131 of the middle case 13.

In detail, the inlet end (one end) of the upper bypass groove 1311 forming a part of the bypass passage is connected to the other end of the bypass guide area 1006. The indoor air flowing into the bypass guide area 1006 is guided to the upper bypass groove 1311 in the ventilation mode. The outlet end (the other end) of the upper bypass groove 1311 is connected to the exhaust air exhausting area 1004.

The upper bypass groove 1311 may be bent in an n-shape along the edge of the middle case 13 to surround the bottom edge of the supply air discharge area 1002.

An extension arm 135 has a predetermined width from the edge corresponding to the lower end of the second surface 133c among the edges of the bottom surface 131 of the middle case 13 and has a predetermined length toward the first surface 133a. A flow guide wall 136 is formed at the end of the extension arm 135. The flow guide wall 136 extends a predetermined length from both side ends of the extension arm 135 toward the second surface 133b and the fourth surface 133d, and extends a predetermined height toward the upper surface 132 of the middle case 131. The flow guide wall 136 may extend to the same height as that of the side surface 133.

The extension arm 135 separates the bottom surface of the bypass guide area 1006 from the bottom surface of the exhaust air entrance area 1007. In another aspect, it may be described that the bottom surface of the bypass guide area 1006 is reduced by the width of the extension arm 135.

A first damper mounting part 1312 is recessed at the inner edge of the fourth surface 133d corresponding to one side surface of the first damper hole 107 and one side surface of the flow guide wall 136 corresponding to the other side surface of the first damper hole 107. Both side surfaces of the first damper unit 22 are fitted to the first damper mounting part 1312.

In addition, a second damper mounting part 1313 is recessed at the other side surface of the flow guide wall 136 corresponding to one side surface of the second damper hole 108 and the inlet end of the upper bypass groove 1311 corresponding to the other side surface of the second damper hole 108. Both side surfaces of the second damper unit 23 are fitted to the second damper mounting part 1313.

The other end of the flow guide wall 136 contacts one of the four corners of the ventilation module 40 to support one edge of the ventilation module 40.

Meanwhile, a lower flow separation wall 134 extends from the inner edge of the outlet end of the upper bypass groove 1311. The lower flow separation wall 134 forms a lower portion of the flow separation wall.

A pipe accommodation part 1341 is formed on the lower surface of the lower flow separation wall 134 so as to be stepped upward. An air pipe 211 and a liquid pipe 212 extending from the evaporator 21 pass through the pipe accommodation part 1341. That is, the air pipe 211 and the liquid pipe 212 extend below the lower flow separation wall 134.

In addition, a pipe guide jaw 137 protrudes from the inner surface of the first surface 133a. One side surface of the pipe guide jaw 137 supports the side surface of the ventilation module 40, and the other side surface of the pipe guide jaw 137 forms a portion of the edge of the exhaust air exhausting area 1004.

A liquid pipe accommodation groove 1371 and an air pipe accommodation groove 1372 are formed on the lower surface of the pipe guide jaw 137. The liquid pipe 212 and the air pipe 211 passing through the pipe accommodation part 1341 of the lower flow separation wall 134 extend along the air pipe accommodation groove 1372 and the liquid pipe accommodation groove 1371, respectively, and pass through the surface 133a.

In addition, a ventilation module support jaw 138 protrudes from the inner surface of the fourth surface 133d. One side surface of the ventilation module support jaw 138 supports the side surface of the ventilation module 40, and the other side surface of the ventilation module support jaw 138 forms the edge of the exhaust air introducing area 1003.

One side surface of the ventilation module support jaw 138 is formed to face one side surface of the pipe guide jaw 137.

Meanwhile, a suction fan accommodation groove 1323 is recessed in one side of the upper surface 132 of the middle case 13. The suction fan accommodation groove 1323 is formed in the corner area where the second surface 133b and the third surface 133c meet each other. The outdoor air exhaust groove 1332 formed on the third surface 133c communicates with the suction fan accommodation groove 1323.

In addition, an exhaust flow switching surface 1322 defining the bottom surface of the exhaust air flow transition space 106 is formed on the upper surface 132 corresponding to the corner area where the first surface 133a and the second surface 133b meet each other. An exhaust fan mounting wall defining one side surface of the exhaust air flow transition space 106 is formed on the upper surface of the middle case 13, and an exhaust fan mounting groove 1321 is formed in the exhaust fan mounting wall. An exhaust air exhausting groove 1334 is formed in the first surface 133a. The line L2 passing through the center of the exhaust fan mounting groove 1321 and the line L1 passing through the center of the exhaust air exhausting groove 1334 are perpendicular to each other. That is, the flow of indoor air introduced through the exhaust fan mounting groove 1321 is changed by 90 degrees and discharged to the outside through the exhaust air exhausting groove 1334.

Figure 8:
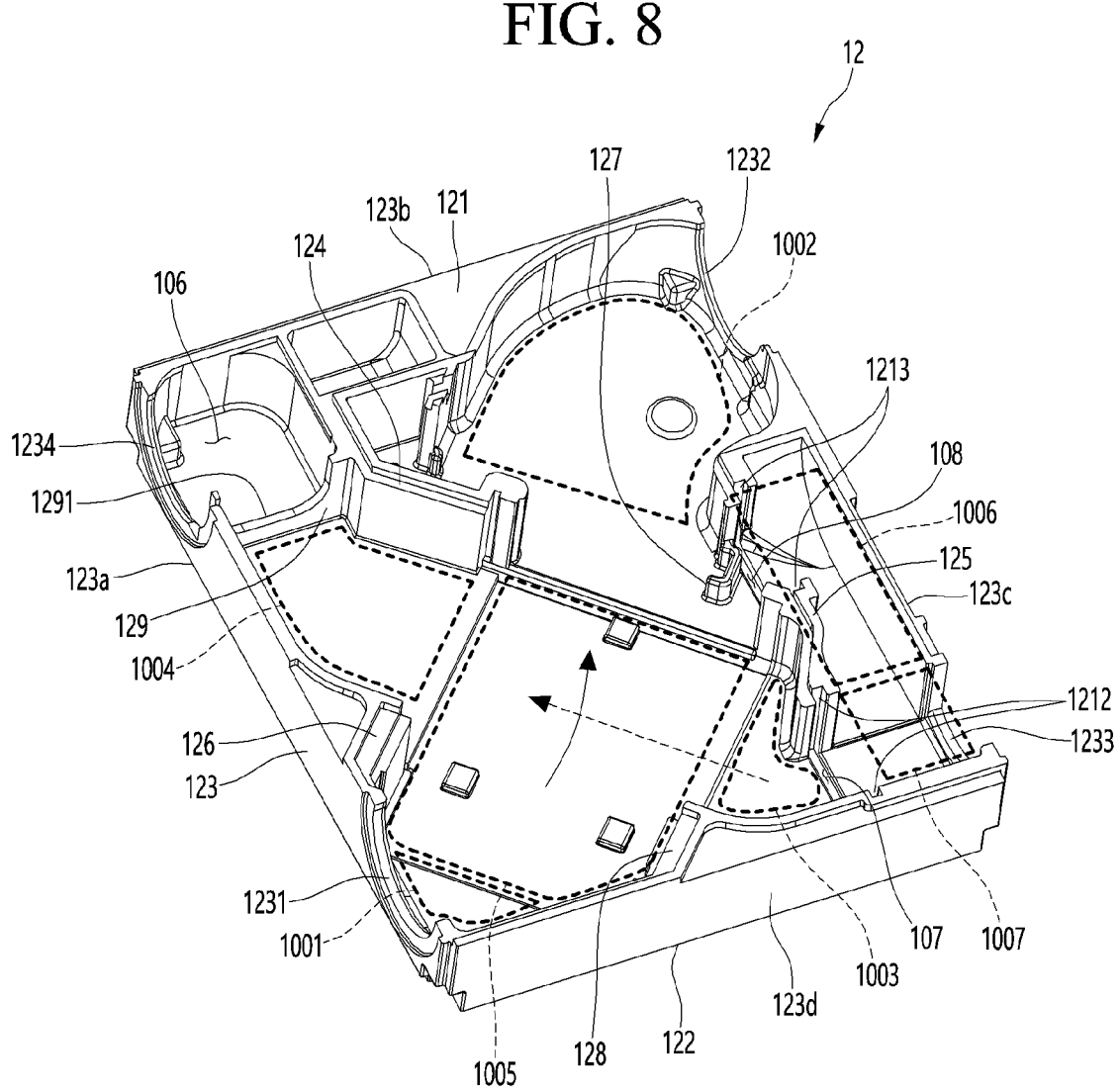
FIG. 8 is a bottom perspective view of an upper case constituting the main case of the ventilation apparatus according to an embodiment of the present disclosure.
Figure 9:
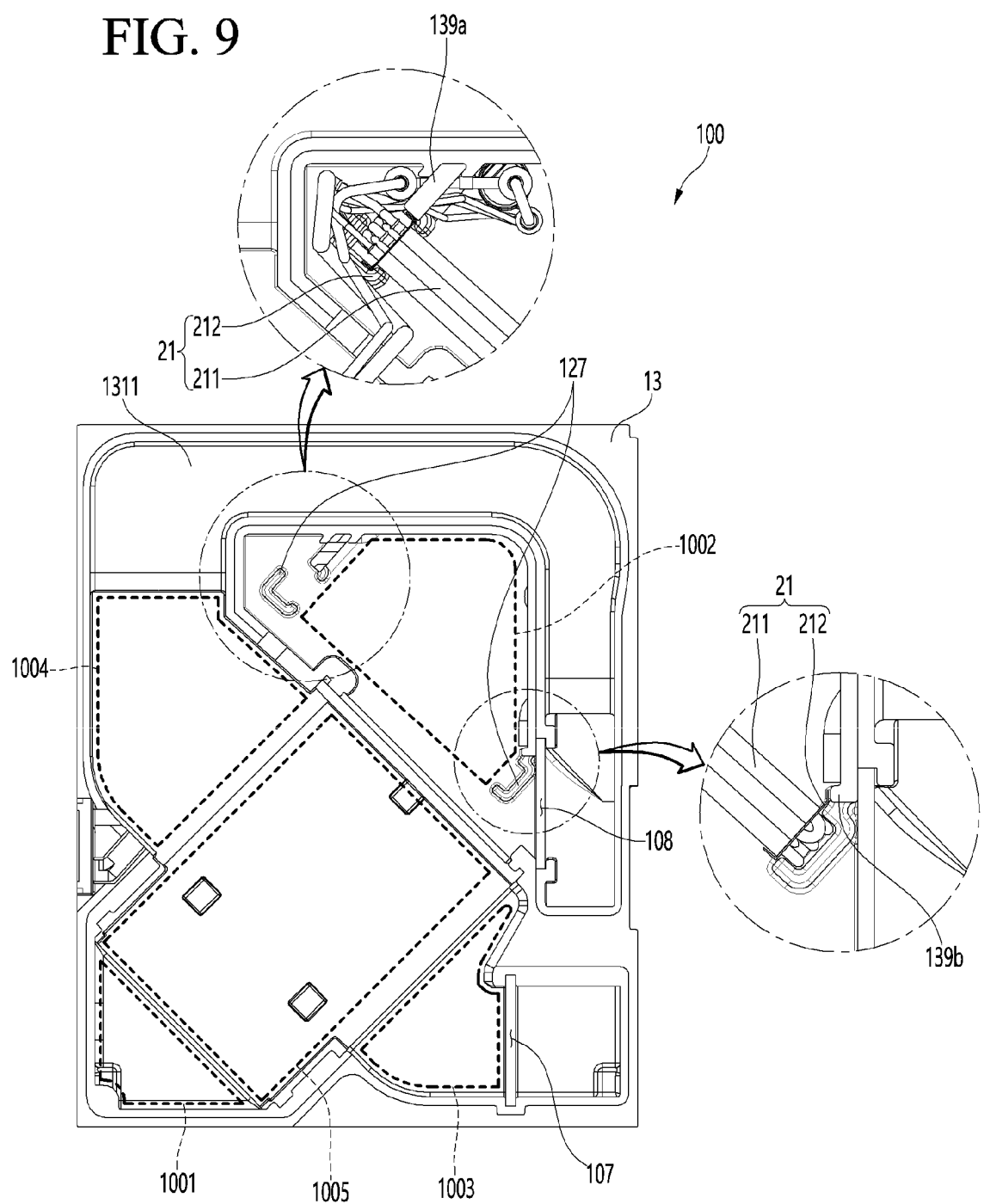
FIG. 9 is a bottom view of the main case.

FIG. 8 is a bottom perspective view of the upper case constituting the main case of the ventilation apparatus according to an embodiment of the present disclosure, and FIG. 9 is a bottom view of the main case.

Referring to FIG. 8, the upper case 12 is placed on the upper surface of the middle case 13 to cover open regions formed inside the middle case 13. Protrusion walls corresponding to the shape of the upper surface of the middle case 13 extend from the bottom surface of the upper case 12.

In detail, the upper case 12 includes a bottom surface 121 that is in close contact with the upper surface of the middle case 13, an upper surface 122 which is the opposite surface of the lower surface 121, and a side surface 123 connecting the bottom surface 121 to the upper surface 122.

The side surface 123 includes a first surface 123a, a second surface 123b, a third surface 123c, and a fourth surface 123d. The first surface 123a forms the same surface as the first surface 133a of the middle case 13, and the second surface 123a forms the same surface as the second surface 133b of the middle case 13. The third surface 123c forms the same surface as the third surface 133c of the middle case 13, and the fourth surface 123d forms the same surface as the fourth surface 133d of the middle case 13.

An outdoor air inlet groove 1231 and an indoor air outlet groove 1234 are formed in the first surface 123a. The outdoor air inlet groove 1231 and the outdoor air inlet groove 1331 of the middle case 13 are coupled to form a complete outdoor air inlet 101. An indoor air outlet groove 1234 and an indoor air outlet groove 1334 of the middle case 13 are coupled to form a complete indoor air outlet 104.

An indoor air inlet groove 1233 and an outdoor air outlet groove 1232 are formed in the third surface 123c. The indoor air inlet groove 1233 and the indoor air inlet groove 1333 of the middle case 13 are coupled to form a complete indoor air inlet 103. The outdoor air outlet groove 1232 and the outdoor air outlet groove 1232 of the middle case 13 are coupled to form a complete outdoor air outlet 102.

A first ventilation module support jaw 126 protrudes from the inner surface of the first surface 123a, and the first ventilation module supporting jaw 126 is in close contact with the pipe guide jaw 137 of the middle case 13.

The exhaust air flow transition space 106 is recessed in the bottom edge area of the upper case 12 in which the exhaust air exhausting groove 1234 is formed. When the upper case 12 is coupled to the upper surface of the middle case 13, the exhaust air flow transition surface 1322 forms the bottom surface of the exhaust air flow transition space 106.

An exhaust fan mounting wall 129 defining one side surface of the exhaust air flow transition space 106 is formed on the bottom surface of the upper case 12, and an exhaust fan mounting groove 1291 is formed in the exhaust fan mounting wall 129. The exhaust fan mounting groove 1321 of the middle case 13 and the exhaust fan mounting groove 1291 are coupled to form a complete exhaust fan mounting hole 105 (see FIG. 5).

The upper flow separation wall 124 extends in a diagonal direction from the bottom surface of the upper case 12 corresponding to the corner portion of the exhaust air flow transition space 106, and the lower surface of the upper flow separation wall 124 is seated on the upper surface of the lower flow separation wall 134 of the middle case 13 to complete a complete flow separation wall (see FIG. 5). The end of the flow separation wall functions as a module support wall for supporting one edge of the ventilation module 40.

The supply air introducing area 1001, the supply air discharge area 1002, the exhaust air introducing area 1003, the exhaust air exhausting area 1004, the ventilation module mounting area 1005, the bypass guide area 1006, and the exhaust air entrance area 1007 are formed in the same and size on the bottom surface of the upper case 12 which is directly above the supply air introducing area 1001, the supply air discharge area 1002, the exhaust air introducing area 1003, the exhaust air exhausting area 104, the ventilation module mounting area 1005, the bypass guide area 1006, and the exhaust air entrance area inlet area 1007 formed in the middle case 13.

A flow guide wall 125 in close contact with the flow guide wall 136 of the middle case 13 protrudes from the bottom surface of the upper case 12. A first damper mounting part 1212 is recessed at a position corresponding to the first damper mounting part 1312 of the middle case 13, and a second damper mounting part 1213 is recessed at a position corresponding to the second damper mounting part 1313 of the middle case 13. That is, the first damper mounting part 1212 is formed at one end of the flow guide wall 125, and the second damper mounting part 1213 is formed at the other end of the flow guide wall 125.

Meanwhile, as shown in FIG. 3, the evaporator 21 is disposed between the ventilation module 40 and the suction fan module 19, and the upper surface of the evaporator 21 is shielded by the upper case 12. A drain pan 24, which will be described later, is placed on the lower surface of the evaporator 21.

Evaporator support ribs 127 respectively protrude from the bottom surface of the upper case 12 corresponding to two short side edges among the upper surface edges of the evaporator 21.

Referring to FIG. 9, the two evaporator support ribs 127 protrude from the inlet side edge of the supply air discharge area 1002. Each of the evaporator support ribs 127 is formed to be bent multiple times to surround the edge of the upper surface of the evaporator 21.

Meanwhile, the evaporator 21 includes an evaporator body 211 made of an evaporating pipe and a heat exchange fin, and a support channel 212 mounted on the side surface of the short side of the evaporator body 211 to support the evaporating pipe.

The support channel 212 forms a cross-sectional shape that is bent in an approximately n-shape, and a channel support wall 139b supporting the support channel 212 may be formed at the inner edge of the inlet end of the upper bypass groove 1311. That is, one of the two support channels 212 is supported by the channel support wall 139b. The channel support wall 139b is formed at a position adjacent to one of the two evaporator support ribs 127.

A channel support wall 139a may also be formed at a position adjacent to the other one of the two evaporator support ribs 127. The end of the other one of the two support channels 212 may be closely fixed to the channel support wall 139a.

Figure 10:
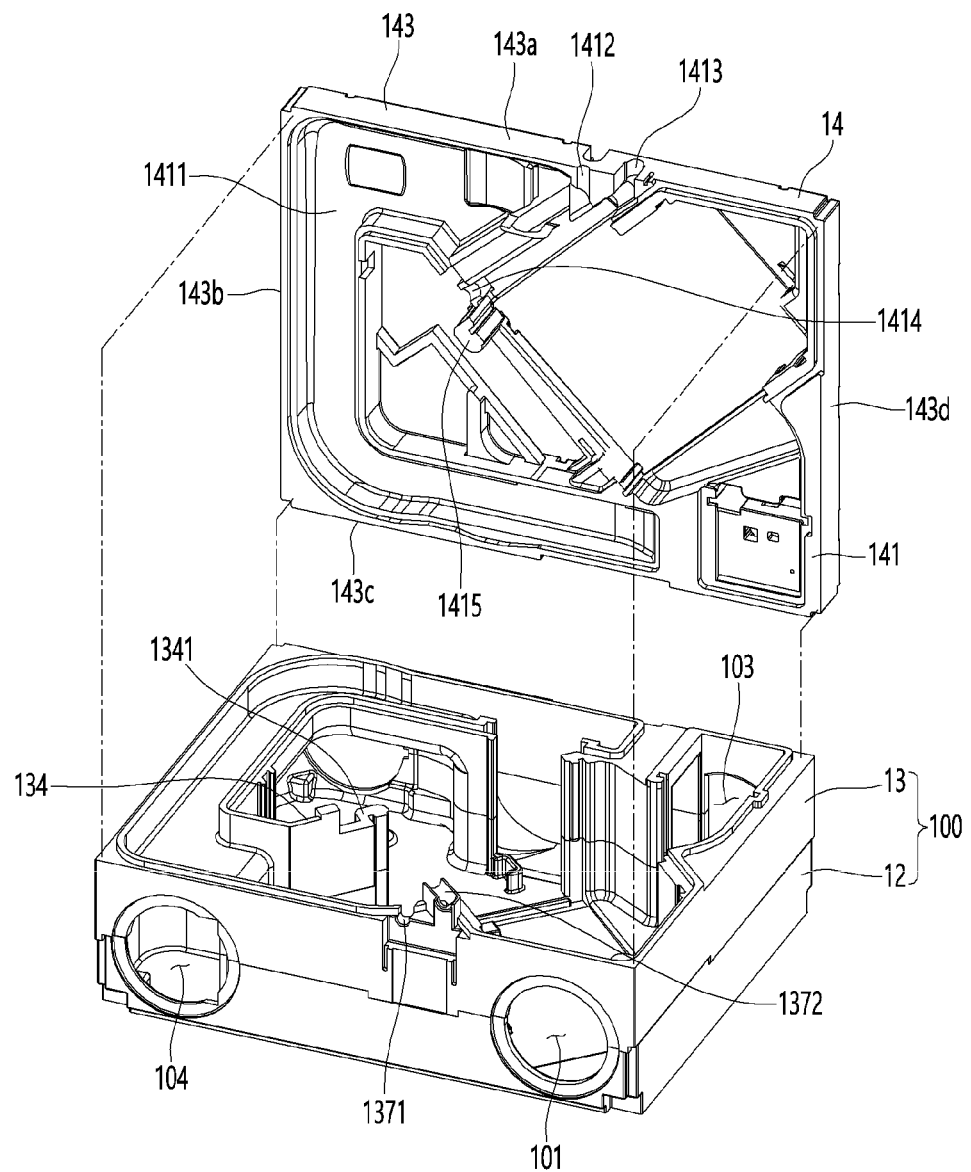
FIG. 10 is a view showing a state in which a lower case is separated from the bottom surface of the main case.
Figure 11:
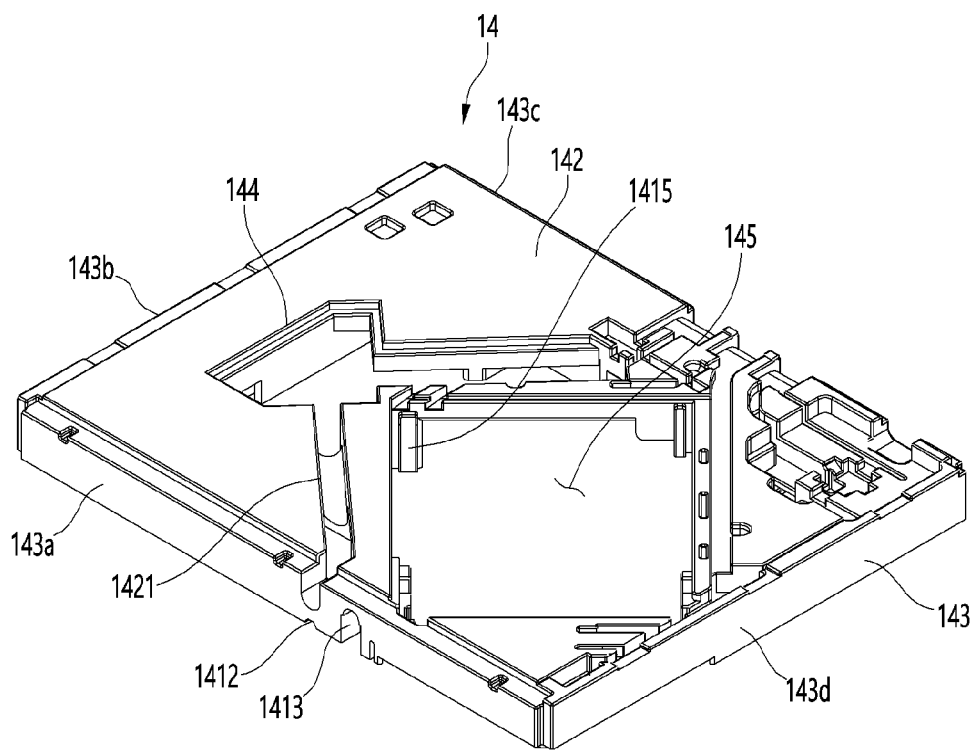
FIG. 11 is a bottom perspective view of the lower case.

FIG. 10 is a view showing a state in which the lower case is separated from the bottom surface of the main case, and FIG. 11 is a bottom perspective view of the lower case.

Referring to FIGS. 10 and 11, the case of the ventilation apparatus 10 according to an embodiment of the present disclosure includes the main case 100 and the lower case 14 coupled to the bottom surface of the main case 100. In detail, the main case 100 is defined as a combination of the upper case 12 and the lower case 13, and the lower case 14 is coupled to the bottom surface of the middle case 13.

Like the upper case 12 or the middle case 13, the lower case 14 includes an upper surface 141, a bottom surface 142, and a side surface 143. The side surface 143 includes a first surface 143a, a second surface 143b, a third surface 143c, and a fourth surface 143d.

Each of the first to fourth surfaces 143a to 143d forms the same surface with each of the first to fourth surfaces 123a to 123d of the upper case 12 and each of the first to fourth surfaces 133a to 133d of the middle case 13.

A lower bypass groove 1411 coupled to the upper bypass groove 1311 of the middle case 13 is formed on the upper surface 141 of the lower case 14, and the upper bypass groove 1311 and the lower bypass groove 1411 are coupled to form a complete bypass passage.

A ventilation module insertion hole 145 and a drain pan mounting hole 144 are formed in the lower case 14.

A module support wall 1415 extends on the upper surface 141 corresponding to one corner of the ventilation module insertion hole 145, and the module support wall 1415 is in contact with the lower surface of the end of the flow separation wall. In detail, when the lower case 14 is coupled to the bottom surface of the middle case 13, the module support wall 1415 comes into contact with the lower surface of the end of the lower flow separation wall 134 of the middle case 13. The end of the module support wall 1415 comes into contact with a portion other than the pipe accommodation part 1341 and does not interfere with the air pipe 211 and the liquid pipe 212 passing through the pipe accommodation part 1341.

A pipe accommodation groove 1414 is recessed at a certain position of the upper surface 141 corresponding to the directly lower side of the pipe accommodation part 1341 to accommodate the liquid pipe 212 and the air pipe 211.

An air pipe accommodation groove 1413 and a liquid pipe accommodation groove 1412 are recessed at the upper end of the first surface 143*a* of the lower case 14 corresponding to the first surface 133*a* of the middle case 13, and are coupled to the liquid pipe accommodation groove 1371 and the air pipe accommodating groove 1372 of the middle case 13.

Meanwhile, a drain pipe accommodation groove 1421 is recessed in the lower surface of the lower case 14. One end of the drain pipe accommodation groove 1421 is connected to the drain pan mounting hole 144, and the other end of the drain pipe accommodation groove 1421 extends to the side surface 143 of the lower case 14. For example, the other end of the drain pipe accommodation groove 1421 may extend to the first surface 143*a*.

Figure 12:
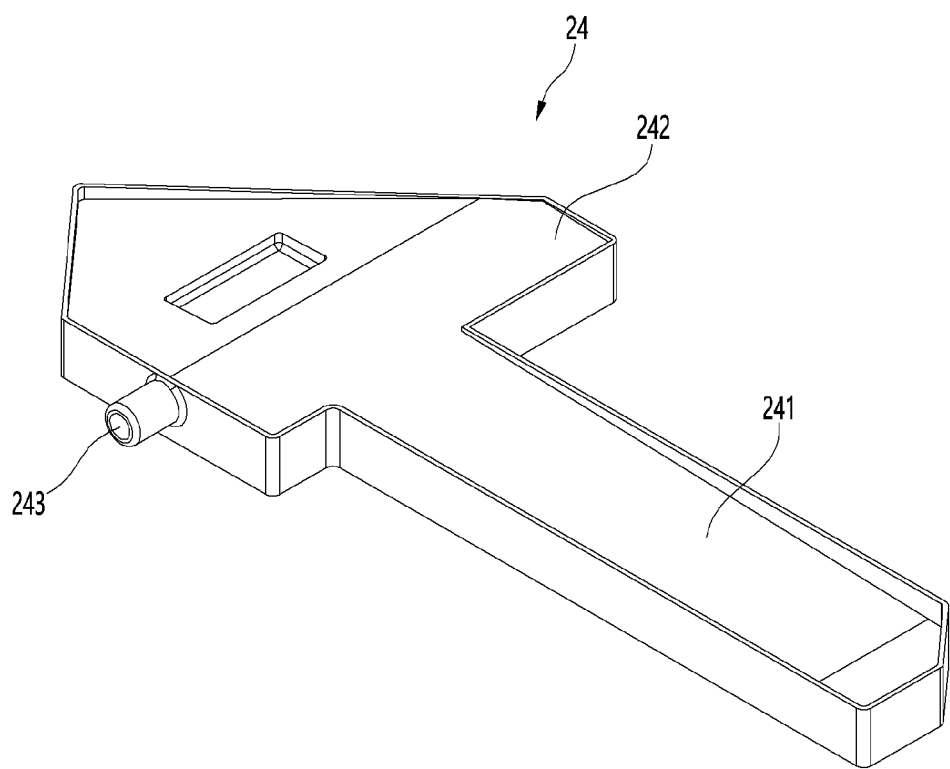
FIG. 12 is a bottom perspective view of a drain pan coupled to the lower case of the ventilation apparatus according to an embodiment of the present disclosure.
Figure 13:
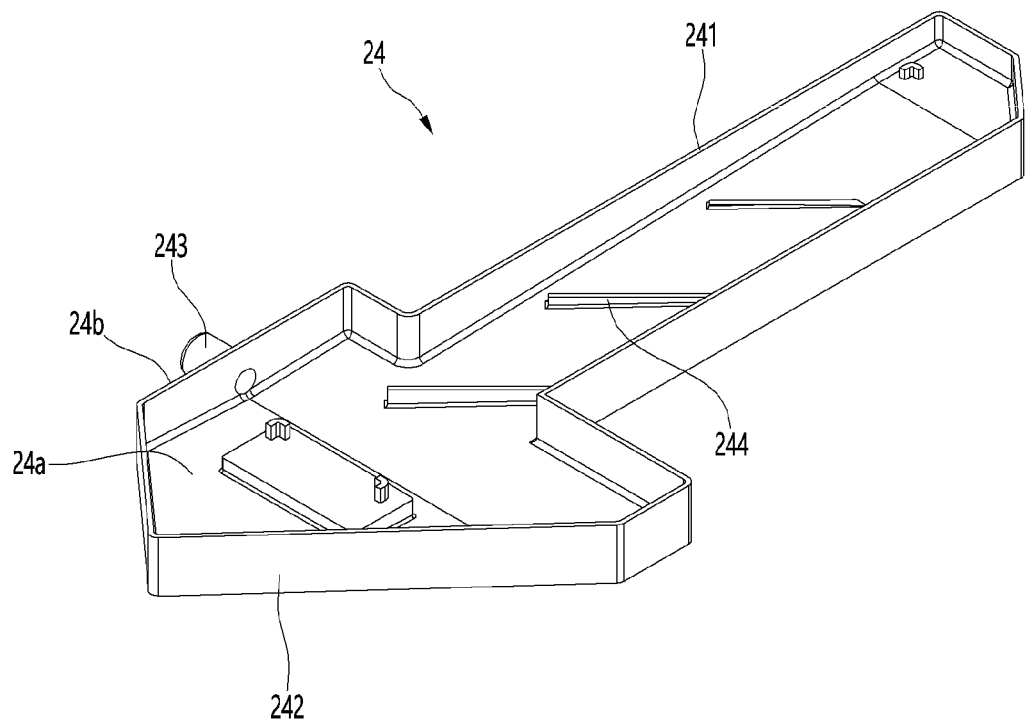
FIG. 13 is a top perspective view of the drain pan.

FIG. 12 is a bottom perspective view of the drain pan coupled to the lower case of the ventilation apparatus according to an embodiment of the present disclosure, and FIG. 13 is a top perspective view of the drain pan.

Referring to FIGS. 12 and 13, the drain pan 24 of the ventilation apparatus 10 according to an embodiment of the present disclosure is coupled to the drain pan mounting hole 144 formed in the lower case 14 to shield the drain pan mounting hole 144.

The evaporator 21 is placed on the upper surface of the drain pan 24, and condensed water flowing down from the evaporator 21 is collected in the drain pan 24.

In detail, the drain pan 24 includes an evaporator seating part 241, a condensed water collection part 242 formed at one end of the evaporator seating part 241, and a drain port 243 extending from one edge of the condensed water collection part 242.

The drain pan 24 includes a bottom part 24*a* on which condensed water falls, and a side part 24*b* erected along the edge of the bottom part 24*a*. The drain port 243 may protrude a predetermined length from the side portion 24*b*.

A plurality of flow guides 244 may protrude from the bottom portion 24*a* so that the condensed water flowing down from the evaporator 21 is guided toward the drain port 243. The drain port 243 is connected to the drain pipe accommodation groove 1421 of the lower case.

Figure 14:
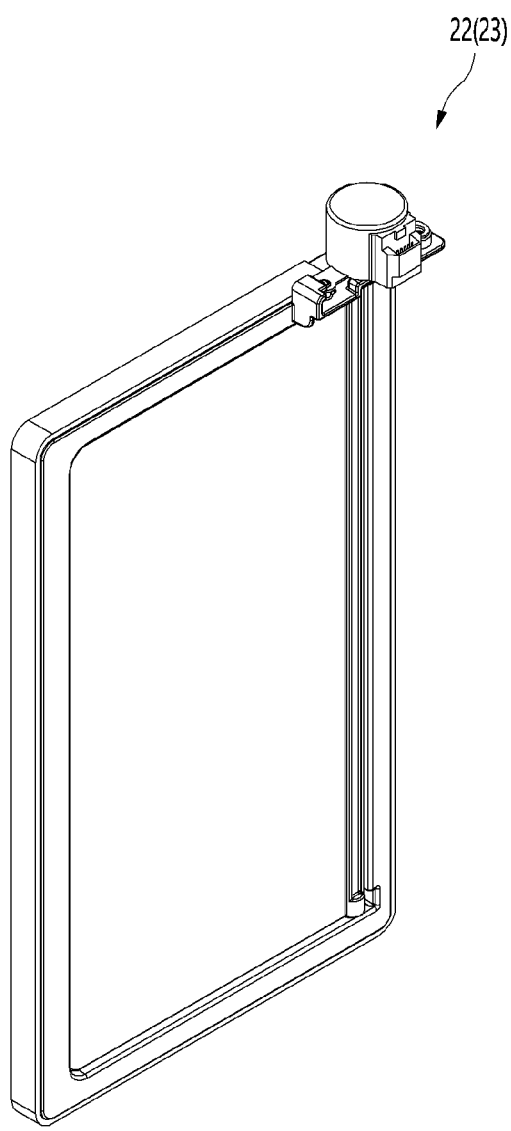
FIGS. 14 and 15 are perspective views of a damper unit constituting the ventilation apparatus according to an embodiment of the present disclosure.
Figure 15:
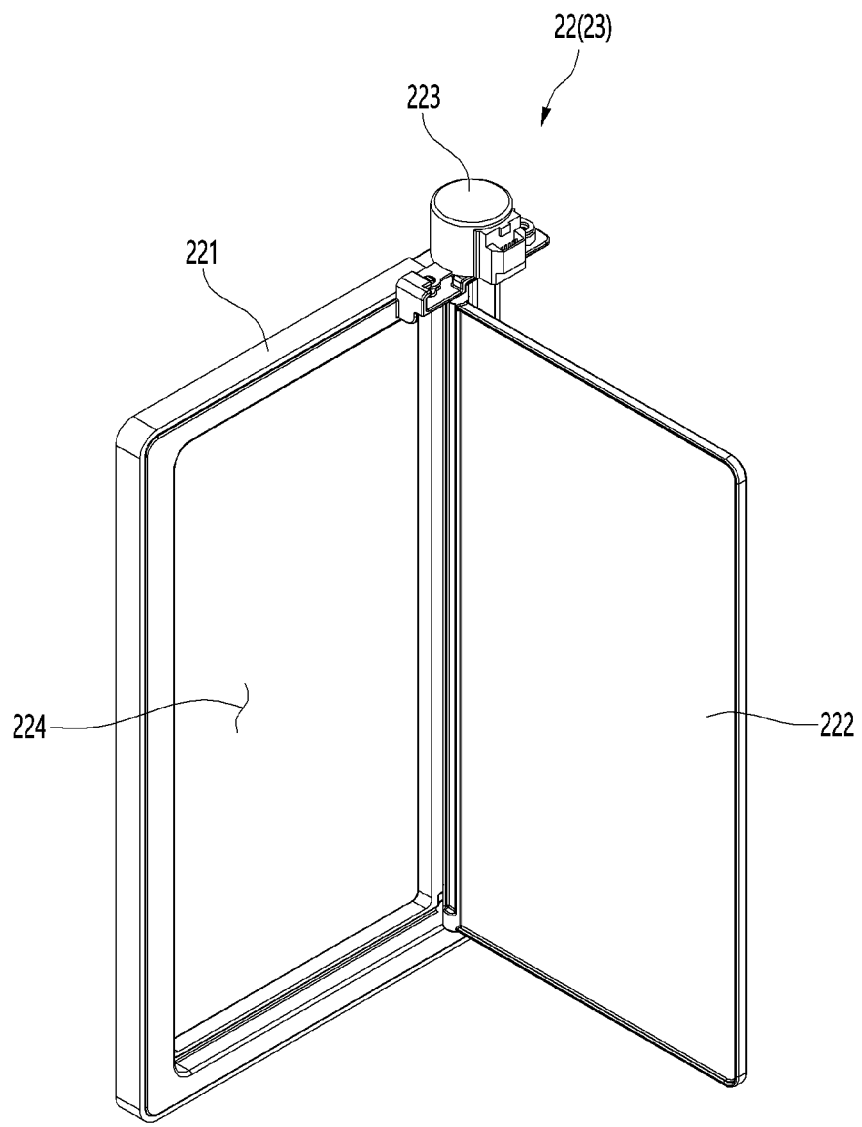
Figure 16:
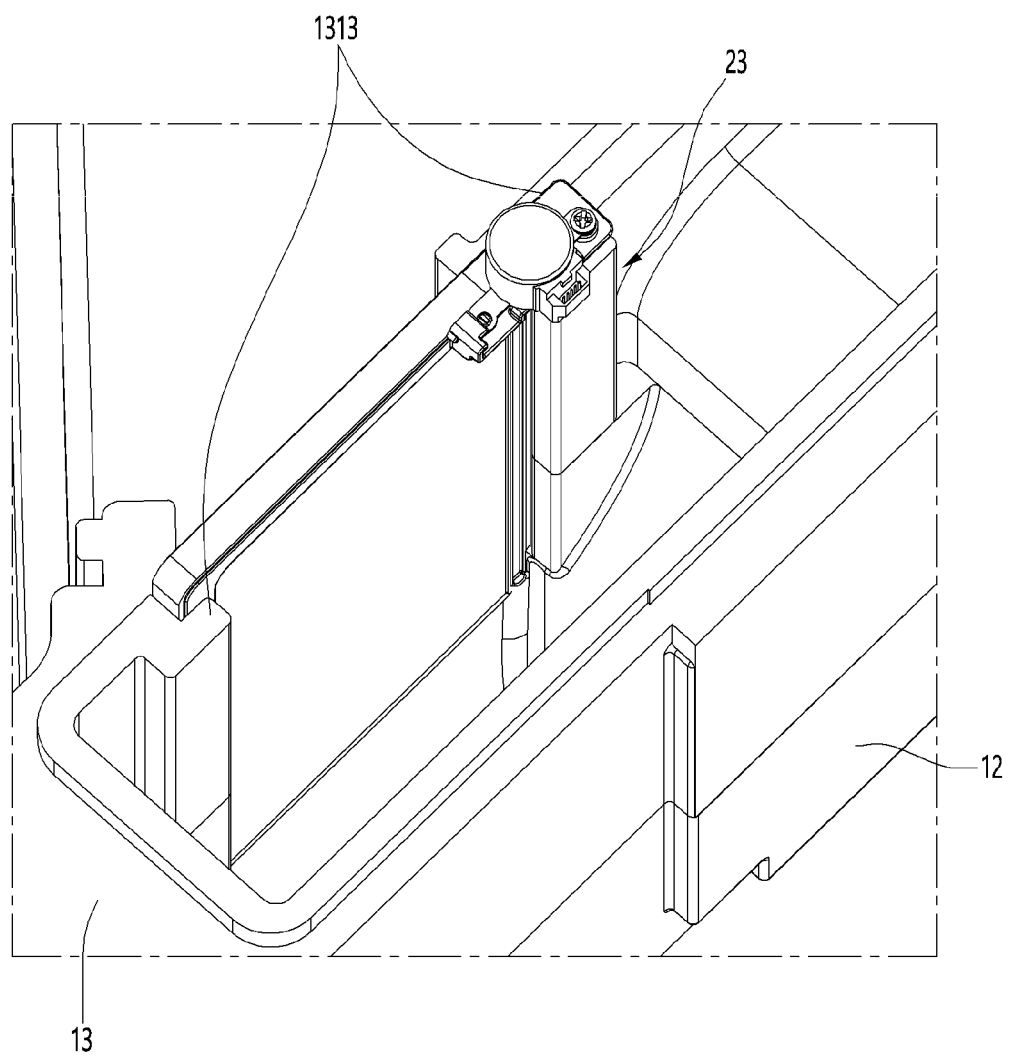
FIG. 16 is an enlarged view of portion A of FIG. 3.
Figure 17:
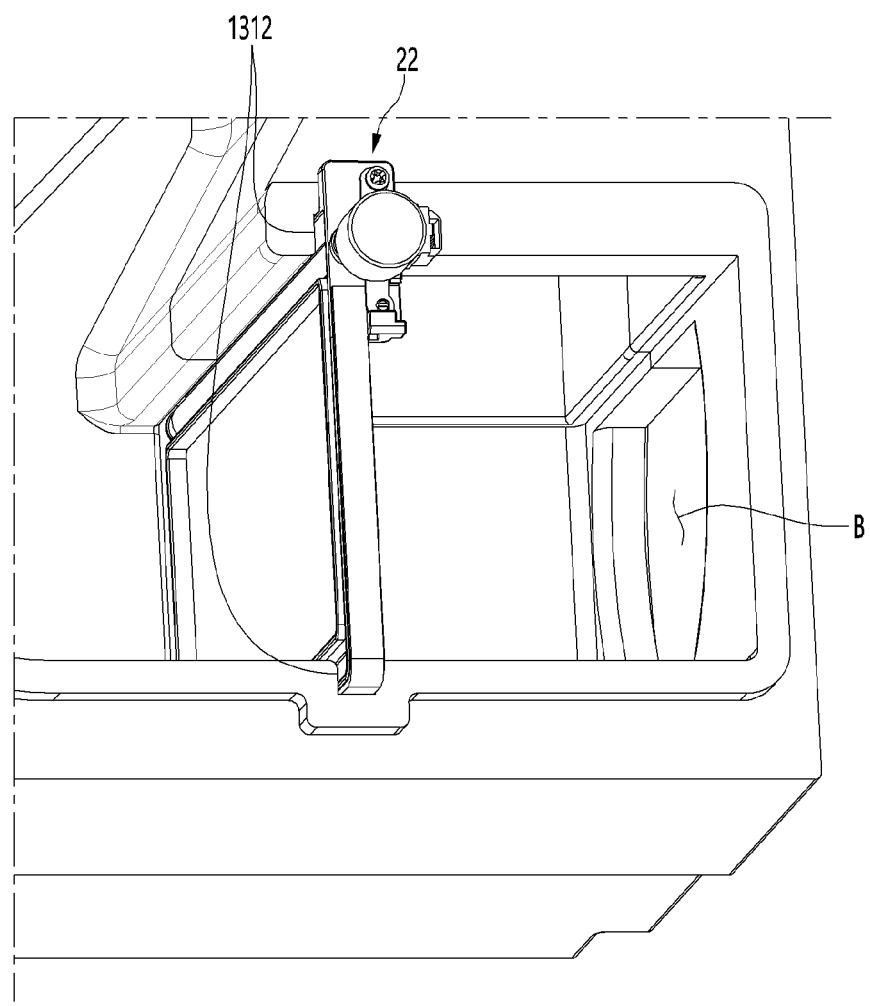
FIG. 17 is an enlarged view of portion B of FIG. 5.

FIGS. 14 and 15 are perspective views of a damper unit constituting the ventilation apparatus according to an embodiment of the present disclosure, FIG. 16 is an enlarged view of portion A of FIG. 3, and FIG. 17 is an enlarged view of portion B of FIG. 5.

In the ventilation apparatus 10 according to an embodiment of the present disclosure, as shown in FIG. 3, a first damper unit 22 and a second damper unit 23 are provided. Hereinafter, the first damper 22 will be described as an example.

In detail, the dampers 22 and 23 include a damper frame 221 having a communication hole 224 formed therein, a damping plate 222 rotatably connected to the damper frame 221 to selectively shield the communication hole 224, and a damping motor 223 that rotates the damping plate 222.

Referring to FIG. 16, both side ends of the damper frame 221 of the second damper 23 are fixed to the second damper mounting part 1313.

When the communication hole 224 is opened by the operation of the second damper unit 23, all or part of the indoor air flowing along the bypass guide area 1006 is guided to the space between the evaporator 21 and the ventilation module 40. The indoor air guided to the space between the evaporator 21 and the ventilation module 40 is cooled while passing through the evaporator 21, and is then supplied back into the indoor space through the outdoor air outlet 102.

Referring to FIG. 17, both side ends of the damper frame 221 of the first damper 22 are fixed to the first damper mounting part 1312.

When the communication hole 224 is opened by the operation of the first damper unit 23, the air guided to the exhaust air entrance area 1007 through the indoor air inlet 103 passes through the exhaust air introducing area 1003, the ventilation module 40, the exhaust air exhausting area 1004, and the exhaust air flow transition space 106 and is then discharged to the outside through the exhaust air outlet 104.

When the communication hole 224 is closed by the operation of the first damper unit 23, the air guided to the exhaust air entrance area 1007 through the indoor air inlet 103 is guided to the bypass passage along the bypass guide area 1006. The air guided to the bypass passage collects in the exhaust air exhausting area 1004, and the indoor air collected in the exhaust air exhausting area 1004 is changed in a flow direction in the exhaust air flow transition space 106 by the exhaust fan unit 20 and then discharged to the exhaust air outlet 104.

Hereinafter, the flow of indoor air and outdoor air for each operation mode will be described in detail with reference to the drawings.

FIGS. 18 to 21 are views showing the flow of air for each operation mode of the ventilation apparatus according to an embodiment of the present disclosure.

In the drawings, an arrow indicated by a solid line indicates the flow of outdoor air, and an arrow indicated by a dotted line indicates the flow of indoor air.

The operation mode that can be performed in the ventilation apparatus 10 according to an embodiment of the present disclosure includes a total heat exchange mode.

Figure 18:
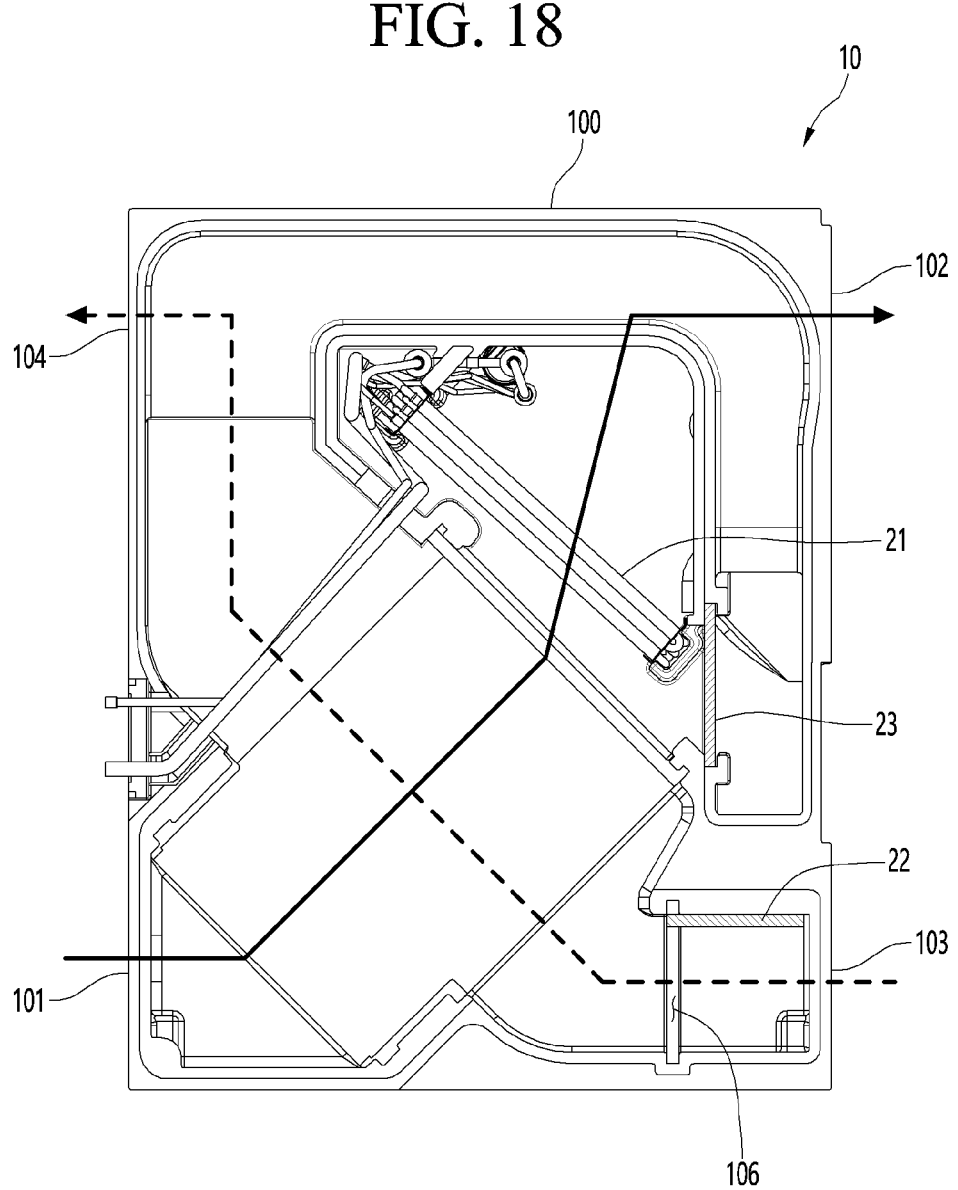
FIGS. 18 to 21 are views showing the flow of air for each operation mode of the ventilation apparatus according to an embodiment of the present disclosure.

Referring to FIG. 18, the total heat exchange mode is an operation mode in which indoor air and outdoor air exchange heat while passing through the ventilation module 40 in a state in which the evaporator 21 is turned off.

In the total heat exchange mode, as is done in a conventional ventilation apparatus provided with a total heat exchanger, heat contained in the indoor air discharged to the outdoors through the total heat exchange element 42 is transferred to the outdoor air supplied to the indoor space through the total heat exchange element 42. That is, waste heat discharged to the outside is recovered back into the indoor space. In the season when the outdoor temperature is lower than the indoor temperature, the air introduced from the outside is supplied to the indoor space after receiving heat from the air discharged from the indoor space. Accordingly, fresh outdoor air is introduced into the indoor space while minimizing the change in indoor temperature.

Also, in the season when the outdoor temperature is higher than the indoor temperature, the introduced outdoor air is supplied to the indoor space in a lowered temperature state by dissipating heat to the discharged indoor air.

Accordingly, fresh outdoor air is introduced into the indoor space while minimizing the change in indoor temperature.

Waste heat recovery is defined as including both the transfer of heat from the discharged indoor air to the introduced outdoor air (hot air transfer) and the transfer of heat from the introduced outdoor air to the discharged indoor air (cold air transfer).

In addition, the operation mode that can be performed in the ventilation apparatus 10 according to an embodiment of the present disclosure includes a direct expansion total heat exchange mode. The direct expansion total heat exchange mode is an operation mode in which total heat exchange is performed in a state in which the evaporator 21 is turned on, that is, a low-temperature and low-pressure two-phase refrigerant flows through the evaporator. Therefore, the direct expansion total heat exchange mode can be understood as a mode for implementing cooling and total heat ventilation through the introduction of outdoor air.

For example, in the case of the direct expansion total heat exchange mode in summer, the outdoor air introduced through the outdoor air inlet 101 dissipates heat to the indoor air discharged to the outdoors through the indoor air inlet 103 while passing through the ventilation module 40, and then passes through the evaporator 21. Accordingly, the amount of decrease in the temperature of the outdoor air supplied to the indoor space is increased, so that the indoor temperature can be quickly lowered.

On the other hand, in winter, the outdoor air absorbs heat from the indoor air discharged while passing through the ventilation module 40 and is then cooled while passing through the evaporator 21. Accordingly, compared to summer, the decrease in temperature is relatively small.

The operation mode that can be performed in the ventilation apparatus 10 according to an embodiment of the present disclosure includes a quick ventilation mode.

Figure 19:
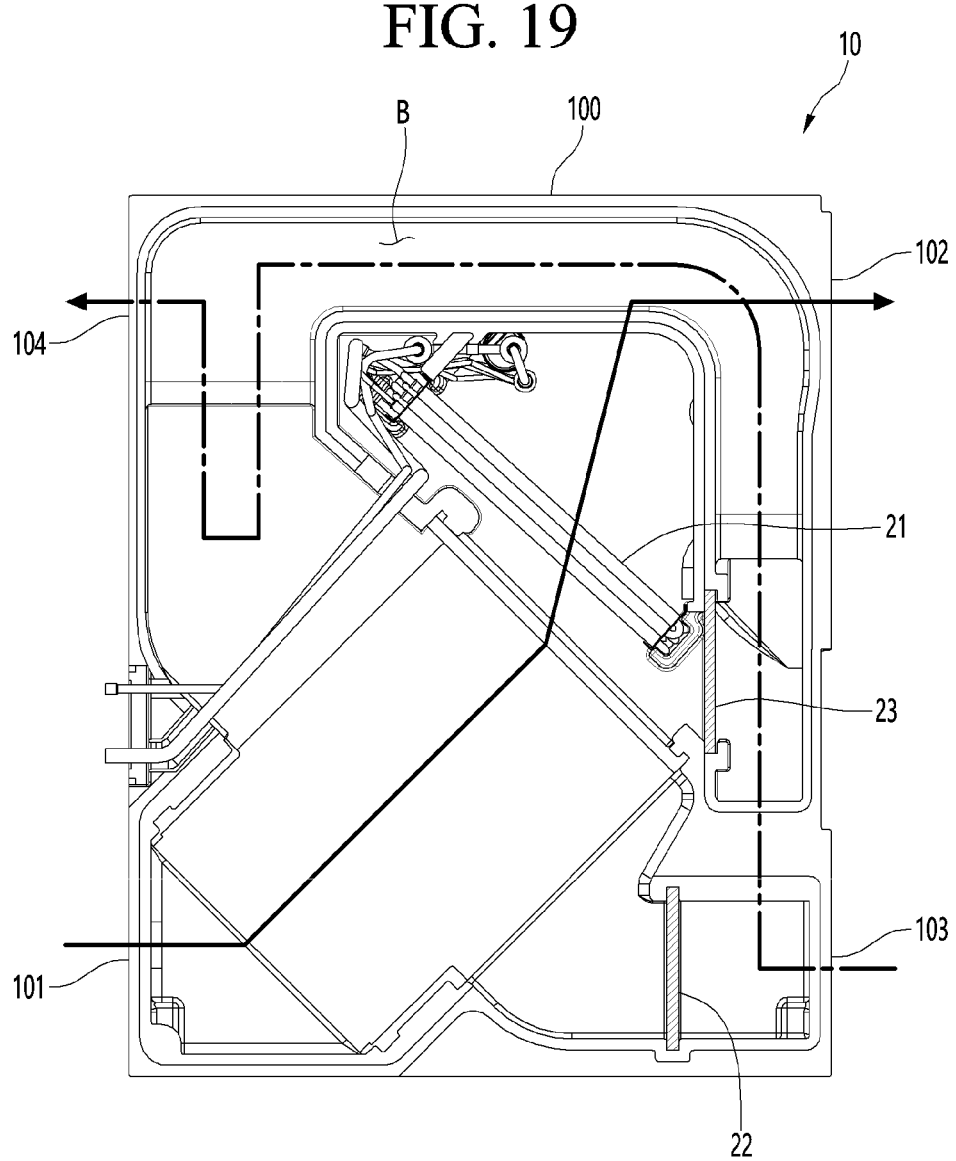

Referring to FIG. 19, the quick ventilation mode refers to an operation mode in which outdoor air is introduced into the indoor space and indoor air is discharged to the outdoors in a state in which the evaporator 21 is turned off, but the indoor air and the outdoor air do not exchange heat with each other.

In detail, in the quick ventilation mode, the outdoor air is introduced into the outdoor air inlet 101, passes through the ventilation module 40 and the evaporator 21, and is then supplied into the indoor space through the outdoor air outlet 102. After the indoor air is introduced through the indoor air inlet 103, the indoor air is discharged to the indoor air outlet 104 through the bypass passage B without passing through the ventilation module 40. Accordingly, since the introduced outdoor air and the discharged indoor air do not exchange heat, the air supplied to the indoor space maintains the same temperature as the outdoor air temperature.

For such an air flow, the first damper unit 22 and the second damper unit 23 close the first damper hole 107 and the second damper hole 108, respectively. The air introduced into the exhaust air entrance area 1007 flows along the bypass guide area 1006, without flowing into the exhaust air introducing area 1003, and is guided to the bypass passage B. The indoor air flowing along the bypass passage B is collected in the exhaust air exhausting area 1004, is guided to the exhaust air flow transition space 106 by the operation of the exhaust fan module 20, and is finally discharged to the outside through the indoor air outlet 104.

In the quick ventilation mode, since the discharged indoor air is discharged directly to the outside without passing through the total heat exchange element 42, contamination of the total heat exchange element 42 can be minimized. For example, if a user selects the quick ventilation mode for ventilation while cooking meat or fish in the kitchen, oil or odor is not deposited onto the total heat exchange element 42, thereby preventing the occurrence of odor.

In addition, since the outdoor air is supplied to the indoor space without absorbing heat from the indoor air, there is an effect in cool weather of quickly lowering the air temperature in the kitchen heated by the gas range, cooktop, oven, etc. by fresh air having a relatively low temperature.

In addition, since the indoor air does not pass through the total heat exchange element, there is an effect of extending the life of the total heat exchange element.

The operation mode that can be performed in the ventilation apparatus 10 according to an embodiment of the present disclosure includes a direct expansion ventilation mode.

The direct expansion ventilation mode refers to a quick ventilation operation performed in a state in which the evaporator 21 is turned on. Therefore, the outdoor air passing through the ventilation module 40 passes through the evaporator 21 without exchanging heat with the discharged outdoor air and is supplied to the indoor space in a low temperature state, and the indoor air is directly discharged to the outdoors through the bypass passage without passing through the total heat exchange element.

Since the direct expansion total heat exchange mode primarily recovers waste heat while passing through the total heat exchange element 42, it can be said that the cooling capacity of the ventilation apparatus 10 is relatively large, compared to the direct expansion ventilation mode.

In detail, in the direct expansion total heat exchange mode, since the temperature of the introduced outdoor air is lowered while exchanging heat with the discharged indoor air, the same effect as that of performing primary cooling is obtained. Secondary cooling is performed while the outdoor air passing through the total heat exchange element 42 passes through the evaporator 21 at a temperature lower than the outdoor temperature.

Therefore, it can be said that the cooling capacity of the ventilation apparatus 10 is relatively large in the direct expansion total heat exchange mode, compared to the direct expansion ventilation mode in which heat exchange does not occur in the total heat exchange element 42.

The operation mode that can be performed in the ventilation apparatus 10 according to an embodiment of the present disclosure includes a quick cooling mode.

In the quick cooling mode, in a state in which the evaporator 21 is turned on and the introduction of outdoor air is blocked, the indoor air passes only through the evaporator 21 without passing through the ventilation module 40 and is then discharged back into the indoor space.

Figure 20:
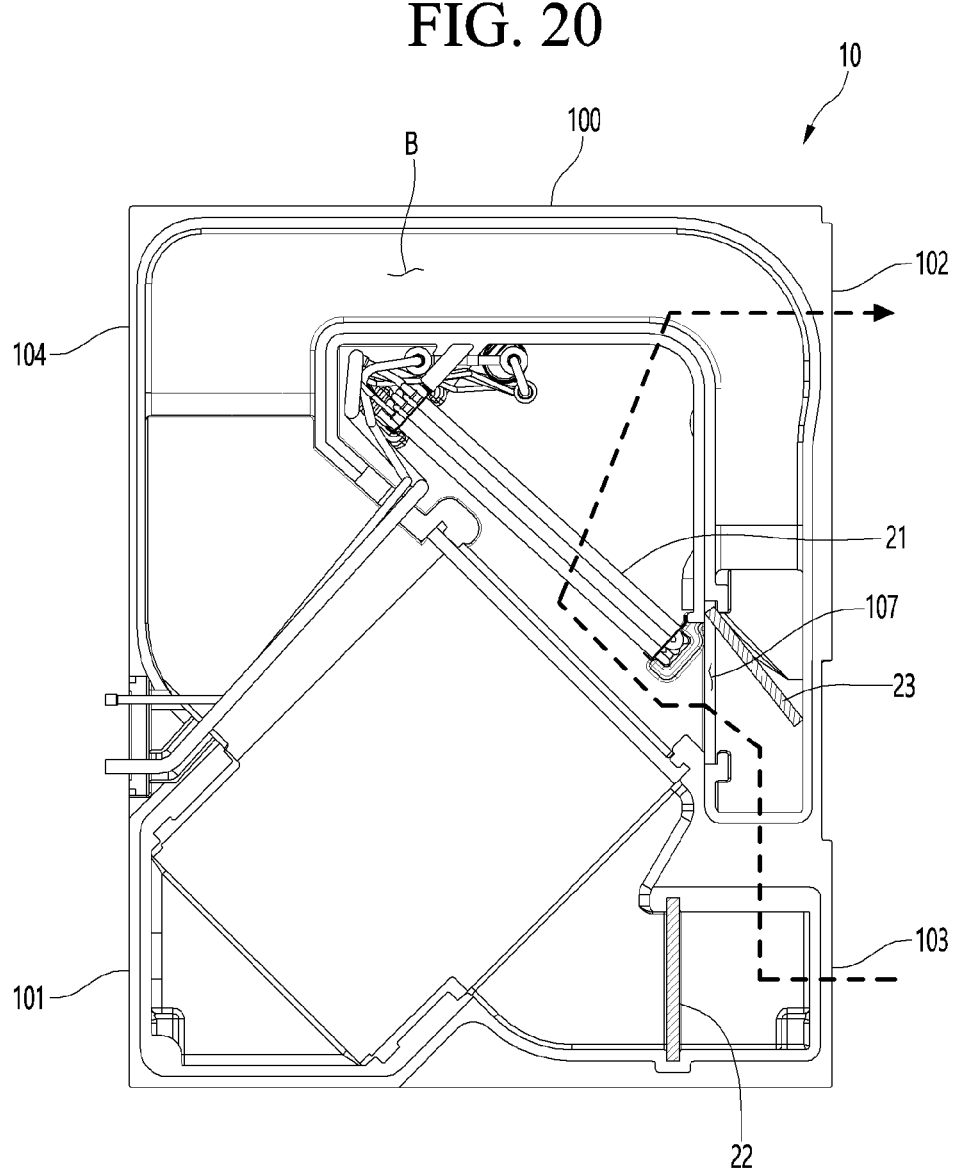

Referring to FIG. 20, in the quick cooling mode, the outdoor air inlet 101 is closed to block the introduction of outdoor air. Although not shown, a damper is mounted on the outdoor air inlet 101 to selectively open and close the outdoor air inlet 101 according to the operation mode. The exhaust fan module 20 maintains an off state.

The first damper unit 22 closes the first damper hole 107. The damping plate 222 of the second damper unit 23 opens the second damper hole 108, and simultaneously, rotates to the position which closes the entrance of the said bypass passage B.

In this state, when the suction fan module 19 rotates, the indoor air introduced into the indoor air inlet 103 is guided to the exhaust air entrance area 1007, and the indoor air flowing from the exhaust air entrance area 1007 to the bypass guide area 1006 is guided to the space between the ventilation module 40 and the evaporator 21. After passing through the evaporator 21, the indoor air is supplied back into the indoor space through the outdoor air outlet 102. Accordingly, it may be understood that the ventilation apparatus 10 in the quick cooling mode performs the same function as an indoor unit of an air conditioner.

The operation mode that can be performed in the ventilation apparatus 10 according to an embodiment of the present disclosure includes a ventilation/cooling simultaneous operation mode.

The ventilation/cooling simultaneous operation mode refers to an operation mode in which the direct expansion total heat exchange mode and the quick cooling mode are simultaneously performed.

Figure 21:
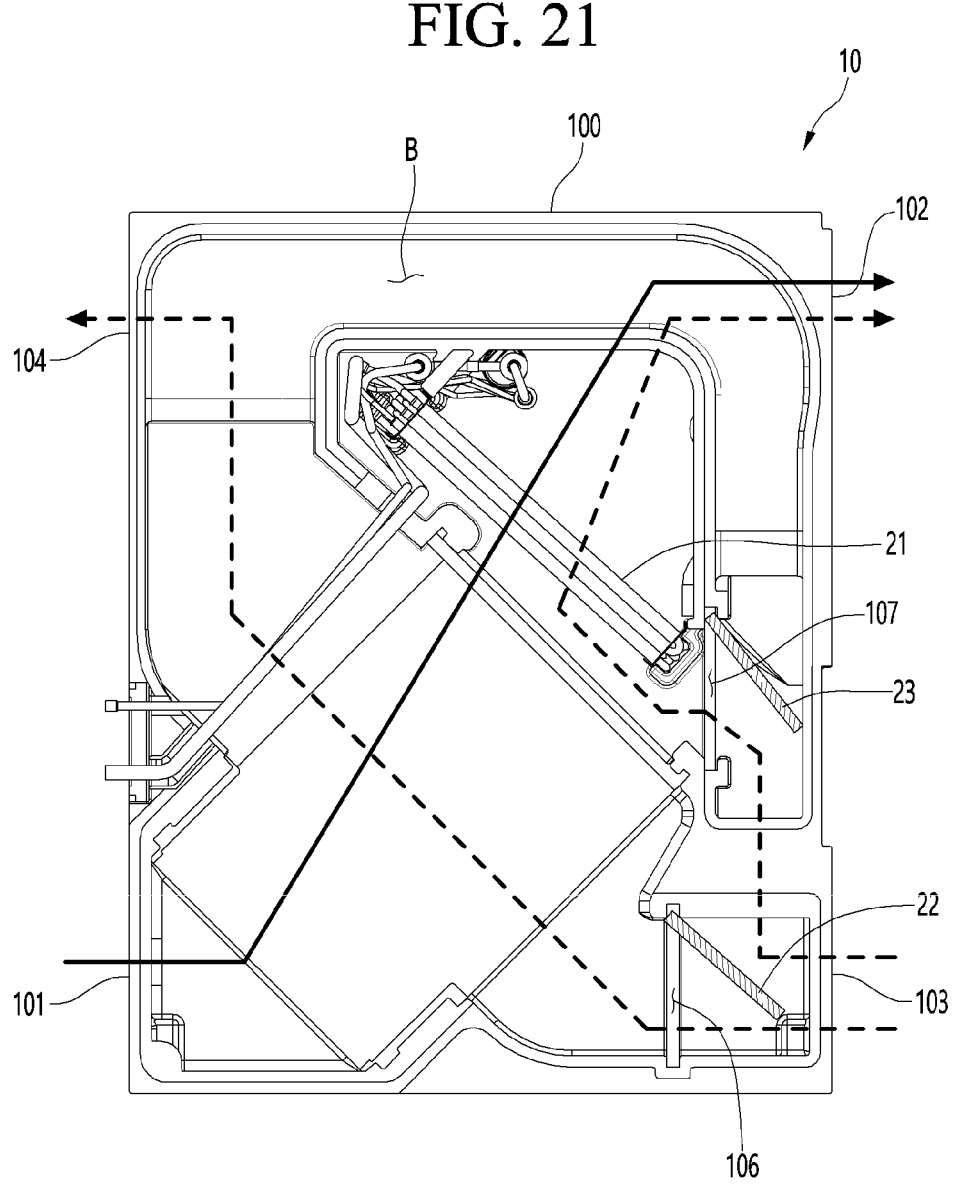

Referring to FIG. 21, in the ventilation/cooling simultaneous operation mode, the damping plate 222 of the second damper unit 23 opens the second damper hole 108 and closes the inlet of the bypass passage B.

The damping plate 222 of the first damper unit 22 rotates at an angle of less than 90 degrees, so that the indoor air in the exhaust air entrance area 1007 separately flows through the first damper hole 107 and the bypass passage B.

The outdoor air introduced into the outdoor air inlet 101 absorbs waste heat from the indoor air guided to the total heat exchange element 42 and then passes through the evaporator 21. The outdoor air having absorbed the waste heat is guided to the evaporator 21.

In addition, the indoor air guided toward the bypass passage B is guided toward the evaporator 21 by the damping plate 222 of the second damper unit 23, is combined with the outdoor air having absorbed waste heat, and then passes through the evaporator 21.

The outdoor air and the indoor air passing through the evaporator 21 are supplied into the indoor space through the outdoor air outlet 102.

The ventilation/cooling simultaneous operation mode may be usefully used in a situation in which both quick cooling for quickly lowering the indoor temperature and partial ventilation for reducing indoor air pollution are required. For example, when a large number of people flow into one space and thus the indoor temperature rises and the carbon dioxide concentration rises, if the ventilation/cooling simultaneous operation mode is selected, fresh outdoor air is introduced into the indoor space in a cooled state, and a part of the indoor air is discharged to the outside, and at the same time, an effect of rapidly cooling the indoor air can be obtained.

Figure 22:
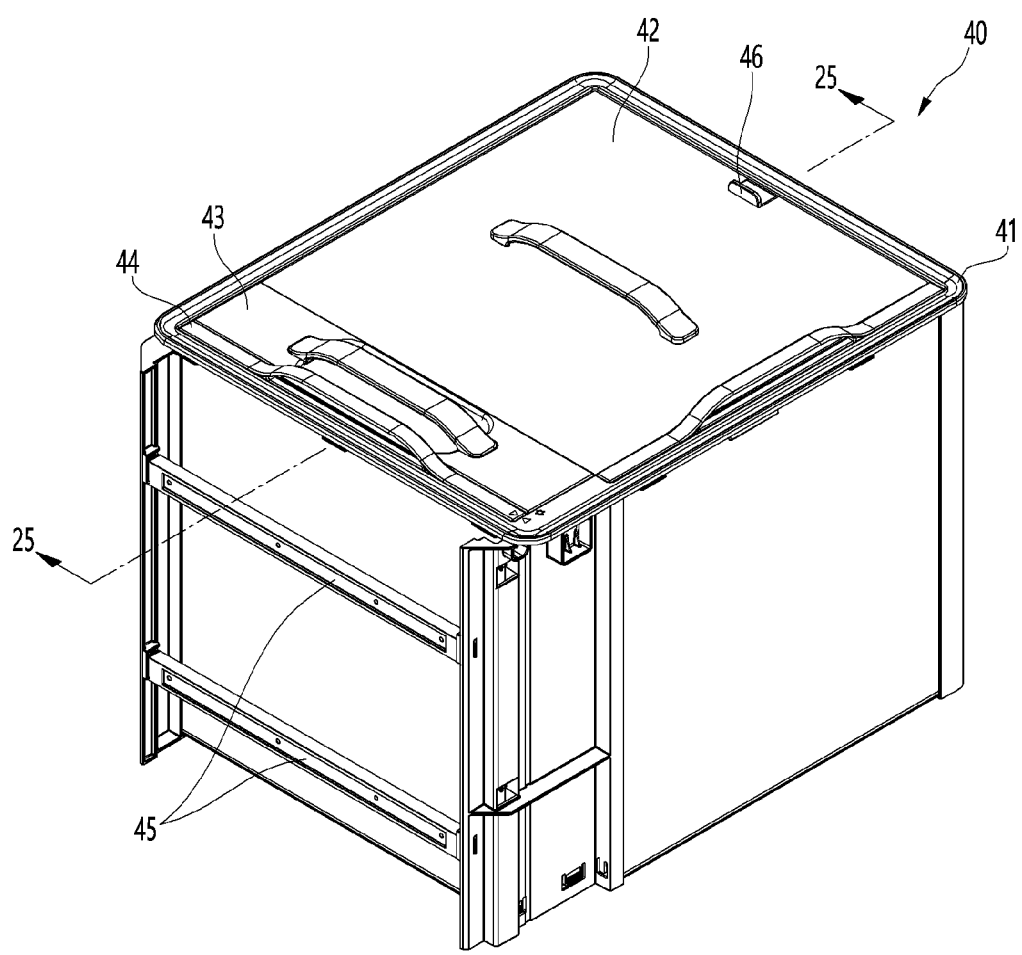
FIG. 22 is a perspective view of a ventilation module constituting the ventilation apparatus according to an embodiment of the present disclosure.
Figure 23:
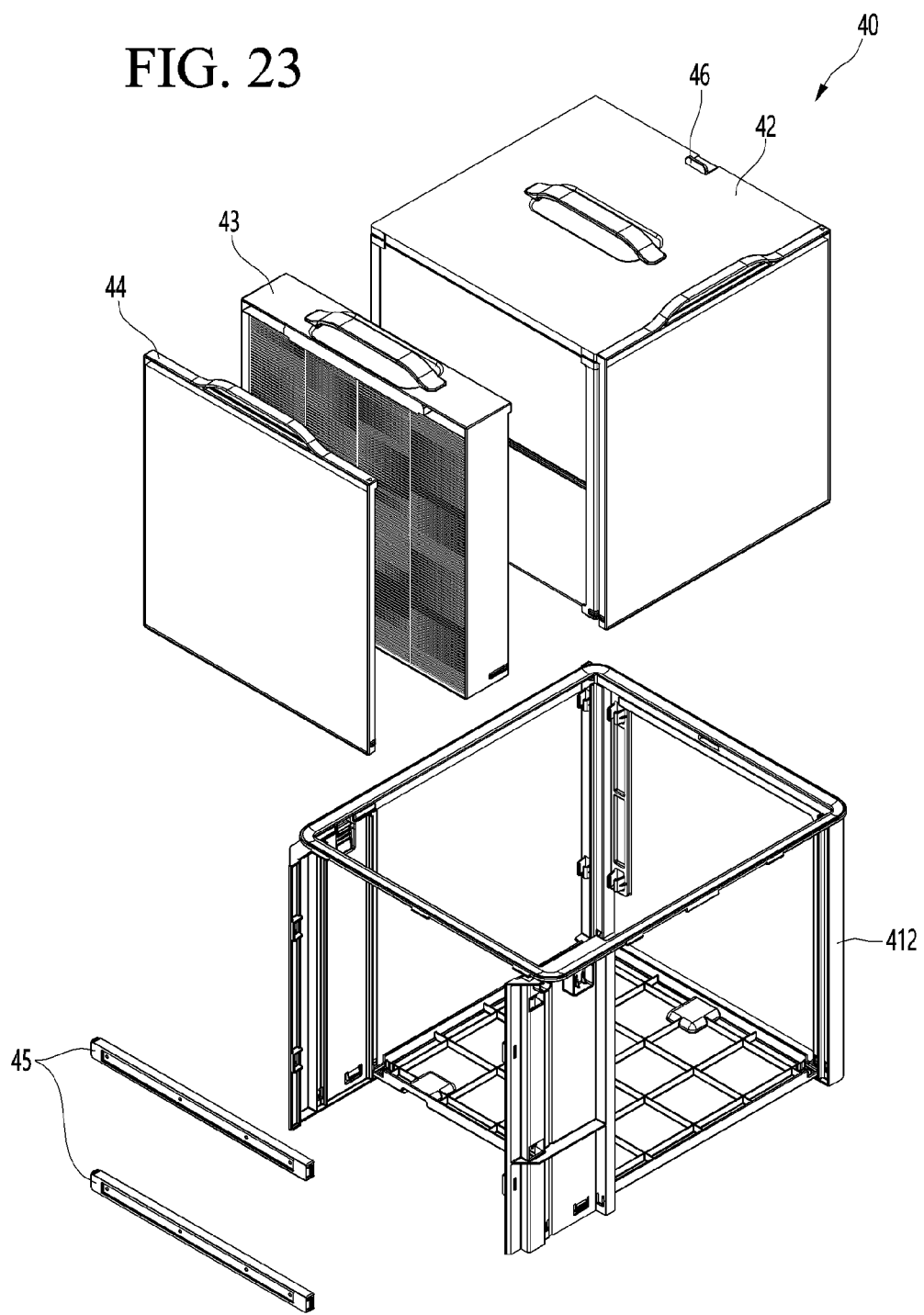
FIG. 23 is an exploded perspective view of the ventilation module.

FIG. 22 is a perspective view of the ventilation module constituting the ventilation apparatus according to an embodiment of the present disclosure, and FIG. 23 is an exploded perspective view of the ventilation module.

Referring to FIGS. 22 and 23, the ventilation module 40 is mounted on the ventilation apparatus 10 according to an embodiment of the present disclosure.

The ventilation module 40 is detachably inserted into the ventilation module mounting area 1005 (see FIG. 5) formed inside the main case 100. In detail, when the ventilation apparatus 10 is installed on the ceiling, as shown in FIG. 1, the user looks up at the bottom of the ventilation apparatus 10.

In this state, in order to replace the ventilation module 40, the shield cover 16 is first opened so that the lower cover 15 is exposed to the outside. In this state, the user may separate the ventilation module 40 by pulling down the ventilation module 40. Alternatively, one of the total heat exchange element 42, the HEPA filter 43, and the pre-filter 44 constituting the ventilation module 40 may be separately separated.

The ventilation module 40 may be provided in the form of a single module by the module frame 41. That is, the total heat exchange element 42, the HEPA filter 43, the pre-filter 44, and the optical filter 45 may be combined into one module by the module frame 41.

The total heat exchange element 42 may be selectively detachably connected from the module frame 41 because a locker 46 is caught on the module frame 41. This will be described in more detail with reference to the drawings.

Figure 24:
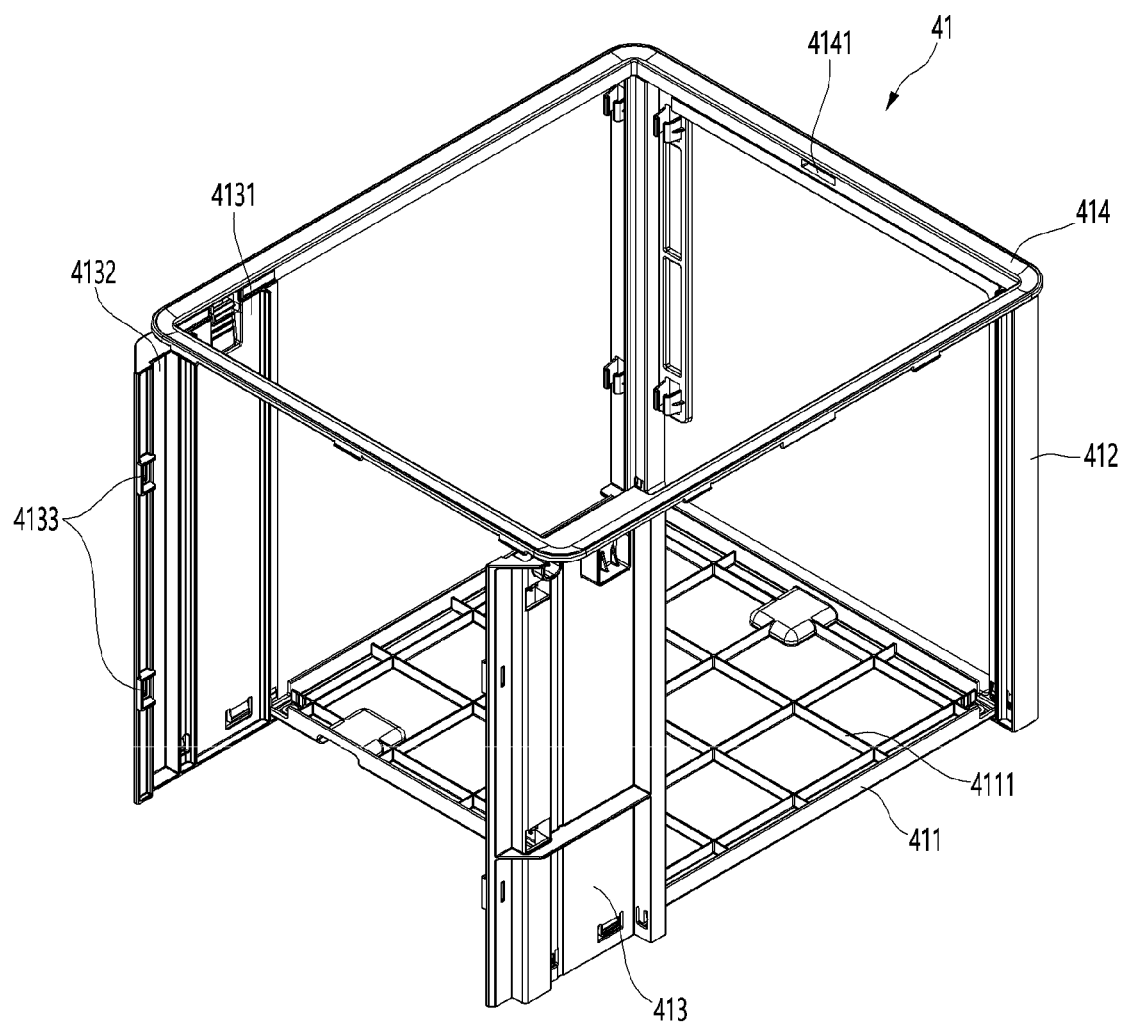
FIG. 24 is a perspective view of a module frame constituting the ventilation module according to an embodiment of the present disclosure.

FIG. 24 is a perspective view of the module frame constituting the ventilation module according to an embodiment of the present disclosure.

Referring to FIG. 24, the module frame 41 of the ventilation module 40 provided in the ventilation apparatus 10 according to an embodiment of the present disclosure may be formed in a hexahedral shape with an empty interior.

In detail, the module frame 41 includes a lower frame 411 forming a bottom portion, a middle frame extending vertically upward from four corners of the lower frame 411, and an upper frame 414 placed on the upper end of the middle frame.

The middle frame includes a rear frame 412 extending vertically from the two corners of the rear end of the lower frame 411, and a front frame 413 extending vertically from two corners of the front end of the lower frame 411.

The upper frame 414 connects the ends of the rear frame 412 and the front frame 413 so that the middle frame stably maintains an upright state.

The lower frame 411 may be provided in the form of a plurality of grid ribs 4111 crossing each other.

A lock hole 4141 is formed on the inner surface of the upper frame 414, and the use of the lock hole 4141 will be described below with reference to the drawings.

The pair of front frames 413 has a predetermined width from the front end of the lower frame 411 to the front, specifically, in a direction away from the rear frame 412. A HEPA filter insertion groove 4131 and a pre-filter insertion groove 4132 are formed on the inner surface of each of the pair of front frames 413, so that both sides of the HEPA filter 43 and the pre-filter 44 are slidably inserted.

In a state in which the total heat exchange element 42, the HEPA filter 43, and the pre-filter 44 are inserted into the module frame 41, the upper frame 414 is coupled to the end of the middle frame.

The ventilation module 40 is mounted on the ventilation apparatus 10 in an inverted state so that the handle portions of the total heat exchange element 42, the HEPA filter 43, and the pre-filter 44 go down. That is, when the ventilation module 40 is mounted on the ventilation apparatus 10, the handles of the total heat exchange element 42, the HEPA filter 43, and the pre-filter 44 are exposed to the outside, as shown in FIG. 1.

Therefore, in a state in which the upper and lower surfaces of the ventilation module 40 are mounted on the ventilation apparatus 10 in an inverted state, the end portions of the upper frame 414 and the middle frame may be hook-coupled or screw-coupled in order to prevent the upper frame 414 from being separated from the middle frame 412 by the load of the total heat exchange element 42, the HEPA filter 43, and the pre-filter 44.

Figure 25:
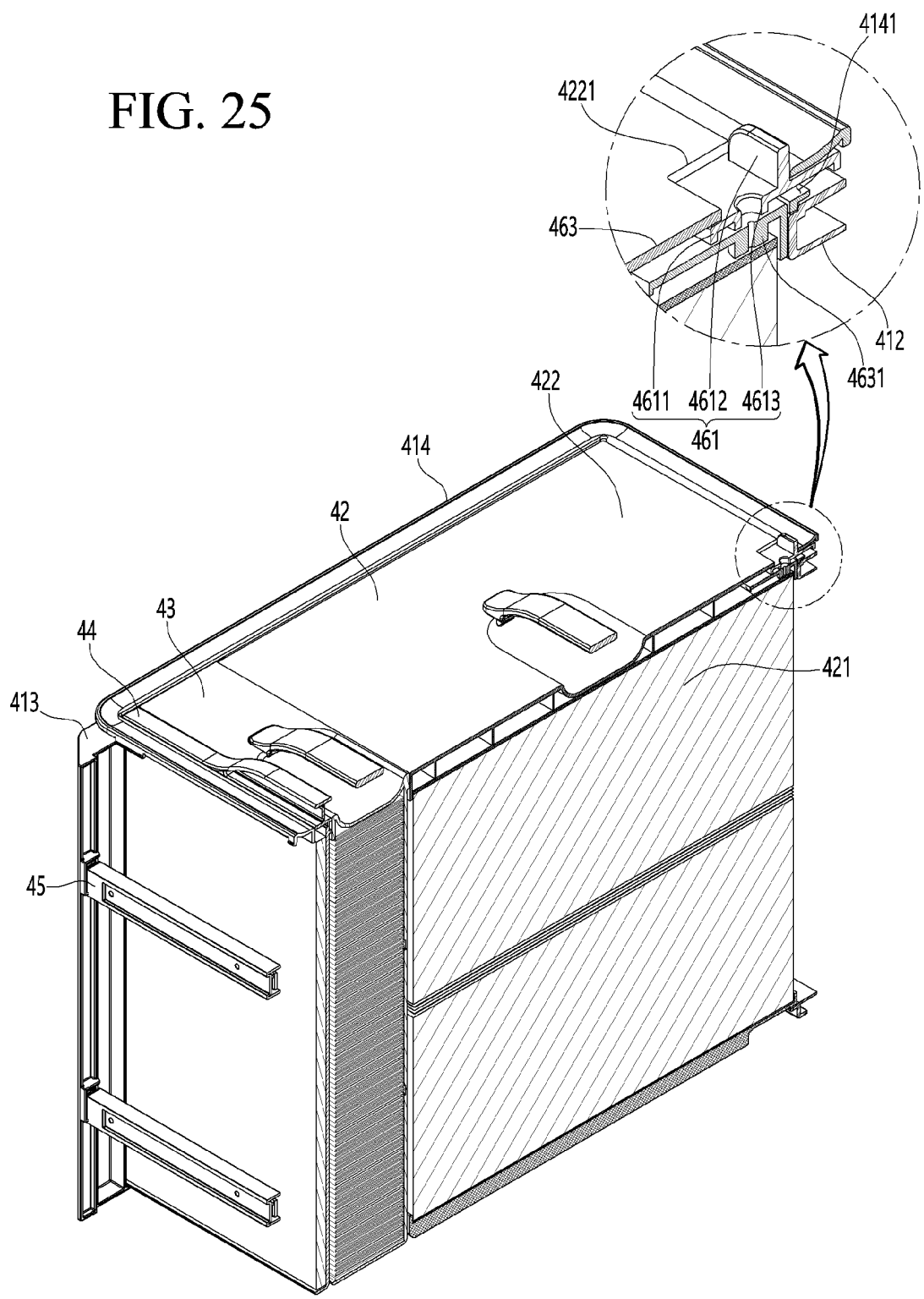
FIG. 25 is a cross-sectional perspective view of the ventilation module taken along line 25-25 of FIG. 22.

FIG. 25 is a cross-sectional perspective view of the ventilation module taken along line 25-25 of FIG. 22.

Referring to FIG. 25, the locker 46 may be provided to increase coupling force between the total heat exchange element 42 and the module frame 41.

In detail, the total heat exchange element 42 includes an element body 421 that exchanges heat by crossing the indoor air and the outdoor air while not mixing the indoor air and the outdoor air, and an upper cover 422 coupled to the upper surface of the element body 421. The upper cover 422 may be provided with a handle.

The locker 46 includes a fixing plate 463 fixed between the upper cover 422 and the element body 421, and a sliding holder 461 provided to be slidably movable between the upper cover 422 and the fixing plate 463.

The fixing plate 463 functions as a connecting member connecting the upper cover 422 to the element body 421. A coupling boss 4631 extends toward the element body 421 on the fixing plate 463.

The sliding holder 461 includes a sliding body 4611 moving between the upper cover 422 and the fixing plate 463, and a holder 4612 extending from one surface of the sliding body 4611.

A guide groove 4221 guiding the movement of the holder 4612 is formed in the upper cover 422.

The sliding body 4611 is divided into an inner portion and an outer portion based on the holder 4612, a coupling hole 4613 is formed in the inner portion of the sliding body 4611, and the outer portion of the sliding body 4611 is selectively inserted into the lock hole 4141 formed in the upper frame 414.

In more detail, in order for the total heat exchange element 42 to maintain the state of being fixed to the module frame 41, the user moves the holder 4612 to be in close contact with the inner edge of the upper frame 414. The outer portion of the sliding body 4611 is inserted into the lock hole 4141. In this state, the coupling hole 4613 of the sliding body 4611 and the coupling boss 4631 of the fixing plate 463 are aligned on the same line. When a coupling member such as a screw passes through the coupling hole 4613 and is inserted into the coupling boss 4631, the total heat exchange element 42 is fixedly coupled to the module frame 41.

In order to separate the total heat exchange element 42 from the module frame 41, the coupling member is removed and the sliding holder 461 is moved so that the outer portion of the sliding holder 461 comes out of the lock hole 4141.

What is claimed is:

1. A ventilation apparatus comprising:
a case comprising:
a main case, the main case having:
a suction passage configured to guide outdoor air into an indoor space;
an exhaust passage configured to guide indoor air to an outdoor space, the exhaust passage crossing the suction passage;
an outdoor air inlet defining an inlet of the suction passage and an indoor air outlet defining an outlet of the exhaust passage formed on a first side surface of the main case; and
an outdoor air outlet defining an outlet of the suction passage and an indoor air inlet defining an inlet of the exhaust passage formed on a second side surface of the main case facing the first side surface;
a lower case coupled to a lower side of the main case;
a total heat exchange element disposed at a position inside the main case where the suction passage and the exhaust passage cross each other;
a suction fan located in the suction passage to draw the outdoor air into the suction passage;
an exhaust fan located in the exhaust passage to draw the indoor air into the exhaust passage;
an evaporator located in the suction passage at a position between the total heat exchange element and the suction fan; and
a bypass passage located between the main case and the lower case to bypass the total heat exchange element, the bypass passage being configured such that indoor air introduced into the indoor air inlet is discharged to the indoor air outlet without passing through the total heat exchange element and the evaporator,
wherein the bypass passage extends along the second side surface of the main case, has a first bend to extend along a third side surface of the main case, the third side surface connecting an end of the first side surface of the main case and an end of the second side surface of the main case, and the bypass passage has a second bend to extend along the first side surface of the main case, and the bypass passage does not overlap the total heat exchange element in a thickness direction of the main case, and
wherein a rotational axis of the exhaust fan is non-perpendicular to a central axis of the indoor air outlet.

2. The ventilation apparatus of claim 1, wherein the rotational axis of the exhaust fan is parallel to the central axis of the indoor air outlet.

3. The ventilation apparatus of claim 1, wherein a total heat exchange element mounting area, an exhaust air entrance area communicating with the indoor air inlet, an exhaust air introducing area defined between the total heat exchange element mounting area and the exhaust air entrance area, an exhaust air flow transition space communicating with the indoor air outlet, and an exhaust air exhausting area defined between the total heat exchange element mounting area and the exhaust air flow transition space are defined inside the main case, and
wherein the exhaust passage is a passage that sequentially includes the exhaust air entrance area, the exhaust air introducing area, the total heat exchange element mounting area, the exhaust air exhausting area, and the exhaust air flow transition space.

4. The ventilation apparatus of claim 3, wherein the main case further includes an exhaust fan mounting wall that partitions the exhaust air flow transition space and the exhaust air exhausting area, the exhaust fan mounting wall having an exhaust fan mounting hole, and
wherein an outlet of the exhaust fan is fixed to the exhaust fan mounting wall.

5. The ventilation apparatus of claim 4, wherein a supply air introducing area communicating with the outdoor air inlet and a supply air discharge area communicating with the outdoor air outlet are defined inside the main case,
wherein the total heat exchange element mounting area is defined between the supply air introducing area and the supply air discharge area, and
wherein the suction passage is a passage that sequentially includes the supply air introducing area, the total heat exchange element mounting area, and the supply air discharge area.

6. The ventilation apparatus of claim 5, wherein the suction fan is disposed in the supply air discharge area, and
wherein the exhaust fan is disposed in the exhaust air exhausting area.

7. The ventilation apparatus of claim 4, wherein a bypass guide area connecting the exhaust air entrance area to an inlet of the bypass passage is defined in the main case, and
   wherein an outlet of the bypass passage is connected to the exhaust air exhausting area.

8. The ventilation apparatus of claim 7, wherein the exhaust air flow transition space is located above the outlet of the bypass passage.

9. The ventilation apparatus of claim 1, wherein the main case further includes a middle case having an upper surface, a bottom surface, and an upper bypass groove in the bottom surface,
   wherein the lower case has an upper surface, a lower surface, and a lower bypass groove in the upper surface,
   wherein the upper surface of the lower case is coupled to the bottom surface of the middle case, and
   wherein the bypass passage is defined by the upper bypass groove and the lower bypass groove.

10. The ventilation apparatus of claim 1, wherein an axis of rotation of the suction fan is non-parallel to the axis of rotation of the exhaust fan.

11. The ventilation apparatus of claim 10, wherein the axis of rotation of the suction fan is perpendicular to the axis of rotation of the exhaust fan.

12. The ventilation apparatus of claim 1, further comprising a lower cover coupled to a lower surface of the lower case, the lower cover having a hole through which the total heat exchange element is removable.

* * * * *